(12) United States Patent
Hiraguchi et al.

(10) Patent No.: US 7,204,447 B2
(45) Date of Patent: Apr. 17, 2007

(54) RECORDING TAPE CARTRIDGE

(75) Inventors: Kazuo Hiraguchi, Kanagawa (JP); Wataru Iino, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/190,899

(22) Filed: Jul. 28, 2005

(65) Prior Publication Data

US 2005/0258292 A1    Nov. 24, 2005

Related U.S. Application Data

(62) Division of application No. 10/270,173, filed on Oct. 15, 2002, now Pat. No. 7,051,968.

(30) Foreign Application Priority Data

Oct. 15, 2001   (JP)   ............................. 2001-317087

(51) Int. Cl.
    *G11B 23/07*   (2006.01)
(52) U.S. Cl. .................... 242/348.2; 360/132
(58) Field of Classification Search ................ 242/348, 242/348.2; 360/132
    See application file for complete search history.

(56) References Cited

U.S. PATENT DOCUMENTS

| | | | |
|---|---|---|---|
| 4,045,821 A | 8/1977 | Fujikura | |
| 4,383,660 A | 5/1983 | Richard et al. | |
| 4,426,047 A | 1/1984 | Richard et al. | |
| 5,332,173 A | 7/1994 | Kubota et al. | |
| 5,570,252 A | 10/1996 | Sumner et al. | |
| 5,868,333 A | 2/1999 | Nayak | |
| 6,034,839 A | 3/2000 | Hamming | |
| 6,125,012 A * | 9/2000 | Miyazaki et al. | ........... 360/133 |
| 6,236,539 B1 | 5/2001 | Morita et al. | |
| 6,349,892 B2 | 2/2002 | Morita et al. | |
| 6,581,865 B1 | 6/2003 | Zweighaft et al. | |
| 6,742,738 B2 | 6/2004 | Hiraguchi | |
| 2003/0034527 A1 | 2/2003 | Amerasekera et al. | |
| 2003/0071157 A1 | 4/2003 | Hiraguchi et al. | |
| 2003/0071158 A1 | 4/2003 | Hiraguchi et al. | |
| 2003/0071159 A1 | 4/2003 | Hiraguchi et al. | |
| 2003/0080228 A1 | 5/2003 | Hiraguchi et al. | |
| 2003/0094525 A1 | 5/2003 | Hiraguchi | |
| 2003/0094528 A1 | 5/2003 | Hiraguchi | |
| 2003/0094530 A1 | 5/2003 | Hiraguchi | |
| 2003/0094531 A1 | 5/2003 | Hiraguchi | |
| 2003/0094532 A1 | 5/2003 | Hiraguchi | |
| 2003/0178519 A1 | 9/2003 | Hancock et al. | |

FOREIGN PATENT DOCUMENTS

| | | |
|---|---|---|
| JP | 61-61470 | 12/1986 |
| JP | 9-039832 | 2/1997 |
| JP | 11-213615 | 8/1999 |
| JP | 11-242871 | 9/1999 |
| JP | 11-297032 | 10/1999 |
| JP | 2000-243056 | 9/2000 |
| JP | 2000-331403 | 11/2000 |
| JP | 2001-148181 | 5/2001 |
| JP | 2001-273740 | 10/2001 |

\* cited by examiner

*Primary Examiner*—John Q. Nguyen
(74) *Attorney, Agent, or Firm*—Sughrue Mion, PLLC

(57) ABSTRACT

The present invention provides a recording tape cartridge comprising: a rectangular case having, at a corner portion, an opening for pulling-out of one end of a recording tape, and accommodating the recording tape; and a cover member which opens and closes the opening. The opening is formed by cutting-off the corner portion of the rectangular case, and when the cover member at least opens the opening, the cover member is accommodated within the case.

3 Claims, 18 Drawing Sheets

FIG.18 PRIOR ART
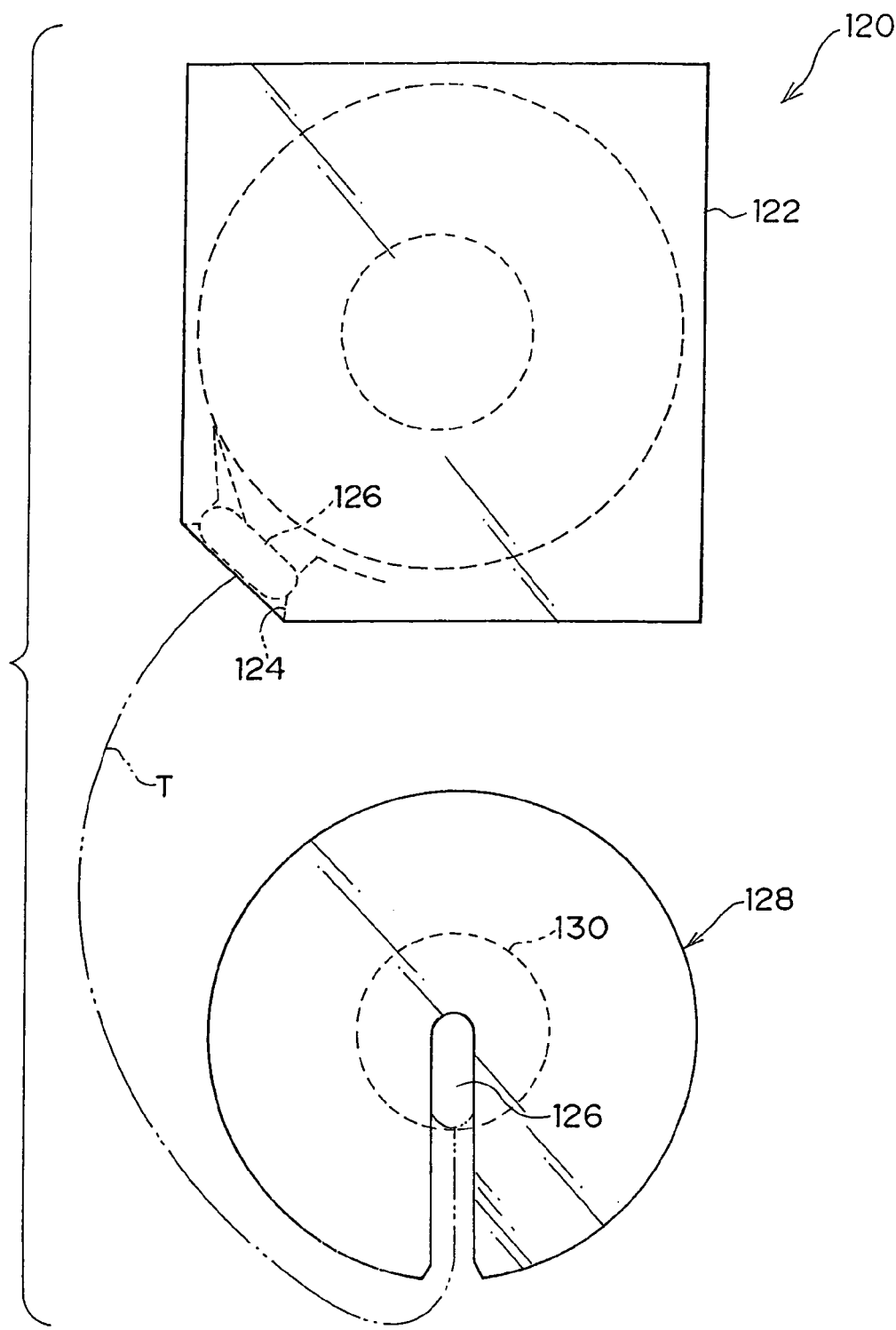

RECORDING TAPE CARTRIDGE

CROSS REFERENCE TO RELATED APPLICATIONS

This is a Divisional of U.S. application Ser. No. 10/270,173 filed Oct. 15, 2002; now U.S. Pat. No. 7,051,968 the entire disclosure of which is incorporated herein by reference.

BACKGROUND OF THE INVENTION

1. Field of the Invention

The present invention relates to a recording tape cartridge which rotatably accommodates a single reel on which is wound a recording tape such as a magnetic tape or the like.

2. Description of the Related Art

Recording tapes, such as magnetic tapes or the like, are used as external recording media for computers and the like. A recording tape cartridge, which requires little space for storage, and in which a large amount of information can be recorded, and which accommodates a single reel on which the recording tape is wound, is used for the recording tape.

An opening is formed in a case of the recording tape cartridge. The recording tape is pulled out from the opening, and is taken-up onto a take-up reel of a drive device. Conventionally, various measures have been devised in order for dust and the like to not enter in from the opening and adhere to the recording tape.

In a recording tape cartridge 100 shown in FIG. 16, an opening 104 is formed in a side wall 102A (a side wall running along a case loading direction A) of a case 102. The opening 104 is opened and closed by a door 106 which slides along the loading direction.

However, at the position of the opening 104, an operation member of the drive device, which pulls-out a leader member (i.e., a leader pin 108) which is attached to an end portion of a magnetic tape T which is the recording tape, must move around from the lateral direction of the case 102 and pull-out the leader pin 108. Thus, space for the operation member to move around (i.e., move non-rectilinearly) must be ensured in the drive device. Moreover, the mechanism for moving the operation member around becomes complex, and the drive device becomes large. In addition, the path along which the magnetic tape T is pulled out becomes long with respect to a take-up reel 110.

In a recording tape cartridge 112 shown in FIG. 17, an opening 116 is formed in a front wall 114A (a front wall facing the case loading direction A) of a case 114. The opening 116 is opened and closed by a pivoting-type door 118 which opens and closes around a shaft.

In this recording tape cartridge 112, because the opening 116 is formed at the front wall 114A, there is no need for the operation member of the drive device to pull-out the magnetic tape T by moving around from the lateral direction. However, because the door 118 outwardly opens widely, space must be ensured in the drive device such that nothing interferes with the opening and closing operations of the door 118. Therefore, the drive device becomes large.

In a recording tape cartridge 120 shown in FIG. 18, an opening 124 is formed by cutting off a corner portion of a case 122. The opening 124 is opened and closed directly by a leader block 126 which is a leader member connected to the end portion of the magnetic tape T.

If the leader block 126 only functions as a door for closing the opening 124, no problems arise even if scratches are formed in or dust adheres to the leader block 126. However, the leader block 126 is pulled out by an operation member of the drive device, and is fit-together with a hub 130 of a take-up reel 128 of the drive device. Thus, if scratches are formed in or dirt adheres to the leader block 126, the leader block 126 cannot fit-together well with the hub 130, and there is the concern that the conveying of the magnetic tape T may be adversely affected. Moreover, because the leader block 126 forms a portion of a take-up surface which takes-up the magnetic tape T, there is the risk that the data recorded on the magnetic tape T will be damaged or that regions which cannot be recorded will arise due to scratches formed in or dirt adhering to the leader block 126.

Further, the leader block 126 is merely anchored at the edge of the opening 126. Thus, there is the concern that, if the case 122 is dropped, the leader block 126 will come apart from the opening 124. Moreover, because the leader block 126 is larger than a leader pin, the number of constraints on the configuration of the case 122 increases.

SUMMARY OF THE INVENTION

In view of the aforementioned, an object of the present invention is to provide a recording tape cartridge in which an opening, which is structured such that the pull-out path of a recording tape can be made to be the shortest, can be opened and closed without a cover member, which enables the accommodating space within the drive device to be made small, interfering with a reel and a leader member, and in which an opening/closing mechanism of the drive device, which opening/closing mechanism operates the cover member and opens and closes the opening, can be made to have a simple structure.

A first aspect of the present invention is a recording tape cartridge comprising: a rectangular case having, at a corner portion, an opening for pulling-out of one end of a recording tape, and accommodating the recording tape; and a cover member which opens and closes the opening.

In the above-described recording tape cartridge, when the recording tape is not being used, the opening is closed from the inner side by the cover member, and entry of dust and the like into the case is impeded. In this way, dust and the like can be prevented from adhering to the recording tape which is wound on the reel accommodated within the case.

On the other hand, when the recording tape is to be used, the cover member is moved, by the opening/closing mechanism of the drive device, to a position alongside and substantially parallel to the side wall of the case such that the opening is opened, and the leader member is pulled-out from the opening. The leader member is lead to a take-up reel by a pull-out mechanism of the drive device. The recording tape is successively pulled-out from the case while being taken-up onto the take-up reel, and information can be recorded or played back by a recording/playback head or the like disposed along a predetermined path of the tape.

Here, the opening is formed by cutting off a corner portion of the rectangular case in the direction of loading the case into a drive device. Therefore, the plane of opening of the opening is directed in the direction of loading the case into the drive device and in a direction orthogonal to the direction of loading and to the thickness direction of the case (i.e., the plane of opening is inclined with respect to the direction of loading). Namely, the pull-out mechanism can access the leader member from the loading direction side, from the direction orthogonal to the loading direction and to the thickness direction of the case, or from the direction of the corner portion (a direction intersecting the aforementioned direction of inclination).

Thus, it is possible to design a drive device in which the path for the pulling-out of the recording tape is the shortest, and there is no need for a drive mechanism in which the pull-out mechanism moves around and chucks the leader member. Thus, a compact and inexpensive drive device can be designed.

Moreover, the cover member opens and closes the opening by moving between a position, at which the cover member closes, from the inner side, the opening which is formed at an incline with respect to the loading direction, and a position at which the cover member opens the opening by being set alongside and substantially parallel to a side wall of the case, which side wall extends along the loading direction, with an end portion of the inclined opening being a proximal end. In other words, the cover member opens the opening by moving rearward from the side of the direction of loading the case into the drive device so as to move around the outer sides of the leader member and the reel, while the orientation of the cover member is varied from a state in which the cover member is inclined with respect to the loading direction to a state in which the cover member is substantially parallel to the loading direction (i.e., while the cover member is rotated either continuously or intermittently), or after the orientation of the cover member has been changed (i.e., after the cover member has been rotated). The cover member closes the opening by being operated in the opposite direction.

Thus, in the processes of opening and closing the opening, the cover member does not jut out from the case any further than the cut-out portion at which the opening of the case is formed, and the space for accommodating the recording tape cartridge within the drive device is small. Moreover, the locus of movement of the cover member does not interfere with the leader member and the reel within the case.

Not only can the opening/closing mechanism of the drive device be designed to operate the cover member from the front side of the case (the leading side in the direction of loading), but also the opening/closing mechanism can be designed to open the opening by moving the cover member rearward due to the operation of the case being loaded into the drive device (relative movement between the case and the drive device). Therefore, the structure can be simplified.

In this way, in the above-described tape cartridge, the opening, which is structured such that the pull-out path of the recording tape can be made to be the shortest, can be opened and closed without the cover member, which enables the accommodating space within a drive device to be made small, interfering with the reel and the leader member. Further, the opening/closing mechanism of the drive device, which opening/closing mechanism operates the cover member and opens and closes the opening, can be made to have a simple structure.

When the path for the pulling-out of the recording tape is made to be the shortest as described above, the entire path along which the recording tape travels also becomes shorter as a matter of course. Thus, the wear due to contact between the recording tape and a tape guide can be reduced. Moreover, by forming the opening by cutting off a corner portion of the case, the range of directions in which the pull-out mechanism can access the leader member as described above is broadened. Therefore, the range of positions at which the leader member can be set within the case is broadened, and the degrees of freedom in designing the drive device can be increased. Further, because the cover member operates as described above, the positions at which the leader member can be set are not affected by the cover member (the range of positions at which the leader member can be set is not narrowed).

The cover member is provided separately from the leader member which is pulled-out from the case, and there is no need to remove the cover member from the case. Therefore, it is possible to implement a design in which the cover member does not easily come apart from the case due to the impact at the time the case is dropped.

Note that "cover member" is a comprehensive term encompassing members which can close the opening, such as a door, a lid, a shutter, a guard panel, and the like.

An abutment portion, which the opening/closing member (opening/closing mechanism) of the drive device abuts, may be provided at the end portion of the cover member which end portion is at the leading side when the recording tape cartridge having the above-described structure is loaded into the drive device. In this structure, due to the operation of loading the recording tape cartridge into the drive device, the cover member moves relatively toward the rear of the case and the opening is opened. Therefore, it suffices for the opening/closing mechanism of the drive device to merely be able to follow the movement of the cover member in a state in which the opening/closing mechanism abuts the cover member whose position is changed in the course of opening the opening, and the structure of the opening/closing mechanism can be simplified.

In the recording tape cartridges of each of the above-described structures, the cover member may be structured to move, while its orientation changes, between a position at which the cover member closes the opening from the inner side, and a position at which the cover member is set alongside and substantially parallel to the side wall of the case and opens the opening. In this structure, the cover member moves between the position of closing the opening and the position of opening the opening while the orientation of the cover member changes (i.e., while the cover member rotates either continuously or intermittently), and the opening can be opened and closed without the cover member jutting out from the region defined by the outer configuration of the case.

Thus, parts of the drive device (e.g., rollers for guiding the recording tape, or the like) can be disposed even at a position within the drive device which position corresponds to the cut-out portion at which the opening of the recording tape cartridge (the case) is formed. Moreover, it is difficult for the user to intentionally open and close the cover member.

The recording tape cartridge, which is structured such that the cover member moves while the orientation thereof is changed, may be provided with a first guide mechanism (e.g., guide grooves into which projections enter) which guides an arbitrary region of the cover member (e.g., projections) along the loading direction at the time of opening and closing the opening, and a second guide mechanism (e.g., guide grooves into which projections enter) which is rectilinear or curved and which guides a region of the cover member (e.g., projections) different from the aforementioned arbitrary region while pivoting the different region around the aforementioned arbitrary region.

In this structure, the cover member is guided by the first and second guide mechanisms, and moves between a position of closing the opening and a position of opening the opening while the orientation thereof is changed (i.e., while rotating either continuously or intermittently). The opening can be reliably opened and closed without the cover member jutting out from the region defined by the outer configuration of the case.

In particular, if the rear end portion of the cover member, which serves as the aforementioned arbitrary region of the cover member, is guided by the first guide mechanism which is provided along a side wall of the case alongside which the cover member is set at the time when the opening is opened, and a vicinity of the front end portion of the cover member, at which front end portion the aforementioned abutment portion is provided, is guided by the second guide mechanism, the cover member can be moved while rotating efficiently by a simple structure, which is suitable.

Moreover, if a bent portion in a direction intersecting a direction of inclination of the opening (the hypothesized direction of operation of the cover member by a user) with respect to the loading direction is provided at the closing side end portion of the second guide mechanism, the cover member cannot be moved by operation of a user, and the closed state of the opening can be maintained. In this way, a simple locking mechanism can be formed without increasing the number of parts.

If the pressure angle between the second guide mechanism and the region of the cover member guided by the second guide mechanism is set within the range of 15° to 60°, the cover member can be operated smoothly, which is suitable.

If an urging member which urges the cover member in the direction of closing the opening is provided, for example, if the drive device can cancel the state of abutment of the opening/closing member and the abutment portion, the opening can be closed and the structure can be simplified. Moreover, the region of the cover member, which is guided by the second guide mechanism can be positioned at the bent portion by the urging member, and the reliability of the aforementioned simple lock mechanism can be improved.

BRIEF DESCRIPTION OF THE DRAWINGS

FIG. 18 is a perspective view showing the overall structure of a conventional recording tape cartridge.

DESCRIPTION OF THE PREFERRED EMBODIMENTS

A recording tape cartridge 10 relating to an embodiment of the present invention will be described hereinafter on the basis of FIGS. 1 through 12. First, a summary of the overall structure of the recording tape cartridge 10 will be given. Thereafter, an opening 20 and a door 30, which serves as a cover member and which opens and closes the opening 20, will be described. The opening 20 and the door 30 are main portions of the present invention. Note that, for convenience of explanation, the direction of loading the recording tape cartridge 10 into a drive device, which direction is denoted by arrow A, is the front direction (the front side) of the recording tape cartridge 10. Further, the direction of arrow B, which is orthogonal to the direction of arrow A, is the right direction.

(Overall Structure of Recording Tape Cartridge)

Figure 1:
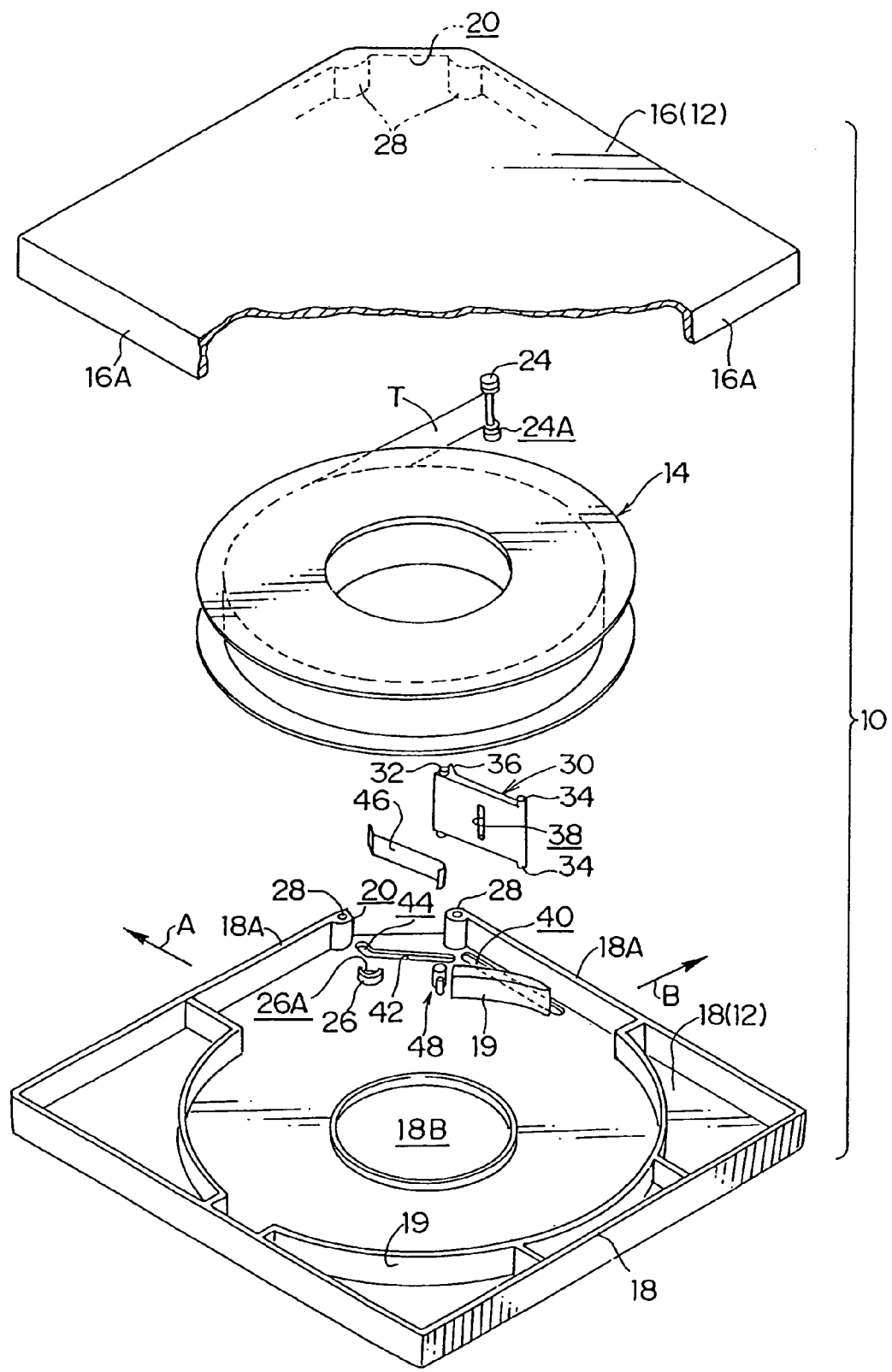
FIG. 1 is an exploded perspective view showing the overall structure of a recording tape cartridge relating to an embodiment of the present invention.

As shown in FIG. 1, at the recording tape cartridge 10, a single reel 14, on which is wound a magnetic tape T serving as a recording tape which is an information recording/playback medium, is rotatably accommodated within a case 12 which is substantially rectangular as seen in plan view.

The case 12 is formed by bringing together peripheral walls 16A, 18A of an upper case 16 and a lower case 18, and joining together the upper case 16 and the lower case 18. The front right corner portion, which is one corner portion at the leading side in the direction of loading into the drive device, of each of the upper case 16 and the lower case 18 is cut off. An accommodating space for the reel 14, on which the magnetic tape T is wound, is formed at the interior of the case 12. The corner portions of the upper case 16 and the lower case 18 where the peripheral walls 16A, 18A are cut off form an opening 20 for pulling-out of the magnetic tape T.

A leader pin 24, which is pulled out while being anchored (engaged) by a chucking mechanism 22 (see FIG. 4) of the drive device, is connected to the free end of the magnetic tape T which is pulled out from the opening 20. An annular groove 24A is formed at each of the end portions of the leader pin 24, which end portions project further than the end portions in the transverse direction of the magnetic tape T. The annular grooves 24A are retained on hooks 22A of the chucking mechanism 22. In this way, when the chucking mechanism 22 pulls the magnetic tape T out, the hooks 22A do not contact and scratch the magnetic tape T.

A pair of upper and lower pin stands 26, which serve as holding portions for positioning and holding the leader pin 24 within the case 12, are provided at the inner side of the opening 20 of the case 12. (The pin stand of the upper case 16 is not illustrated.) The pin stands 26 are formed in the shapes of semicircular tubes, and the end portions of the leader pin 24 which stands erect are held in recess portions 26A of the pin stands 26. The sides of the outer peripheral walls of the pin stands 26, at which sides the magnetic tape T is pulled-out, are open, and form entrances/exits for the leader pin 24 to enter therein and exit therefrom.

A gear opening 18B, which is for exposing to the exterior an unillustrated reel gear of the reel 14, is provided in the central portion of the lower case 18. The reel 14 is driven to rotate within the case 12 due to the reel gear meshing with a drive gear of the drive device. Further, the reel 14 is held, so as to not joggle, by play regulating walls 19 which partially project at the inner surfaces of the upper case 16 and the lower case 18 and which are on a circular locus coaxial with the gear opening 18B.

(Structure of Opening)

Figure 2:
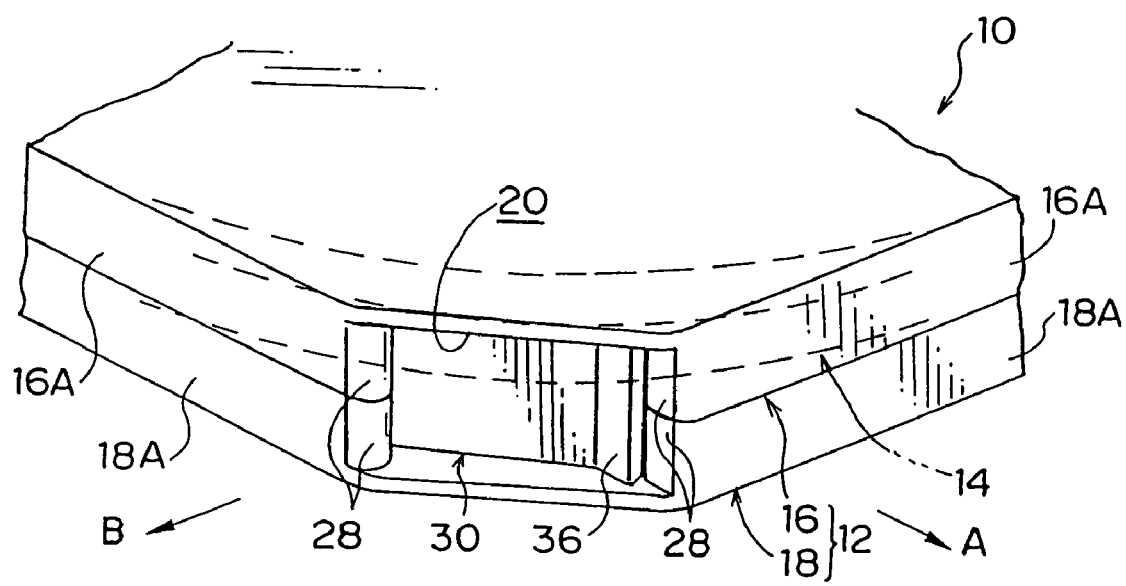
FIG. 2 is a perspective view showing a state in which an opening, which forms the recording tape cartridge relating to the embodiment of the present invention, is closed by a door.
Figure 3:
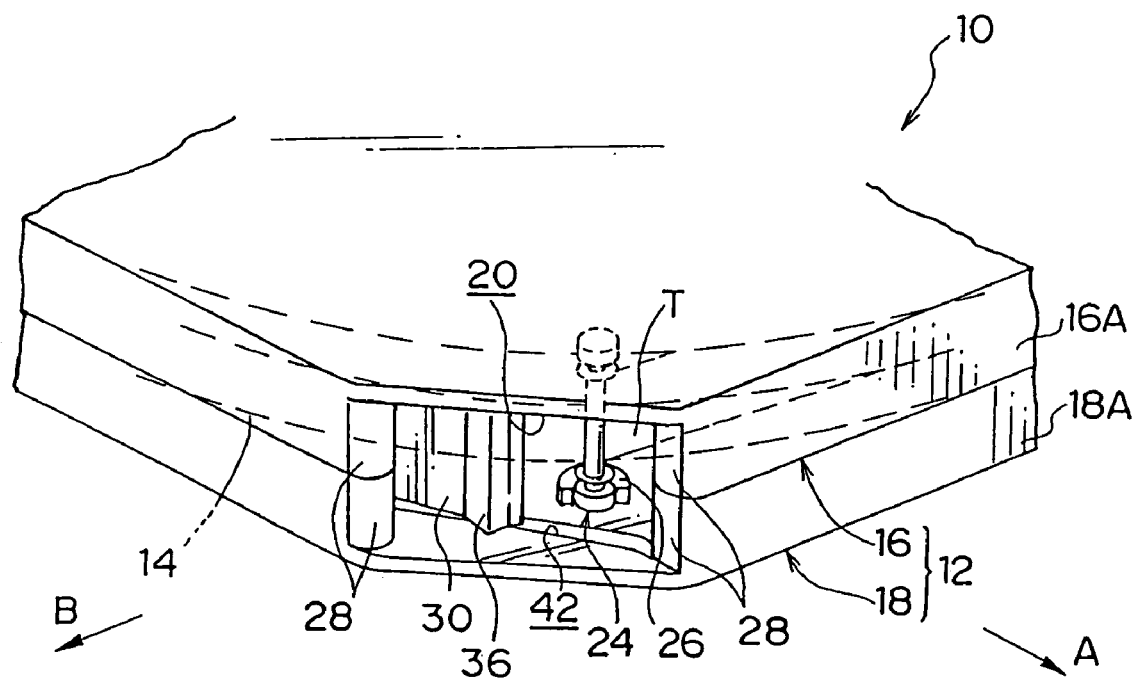
FIG. 3 is a perspective view showing a state in the midst of opening or closing the opening forming the recording tape cartridge relating to the embodiment of the present invention.
Figure 4:
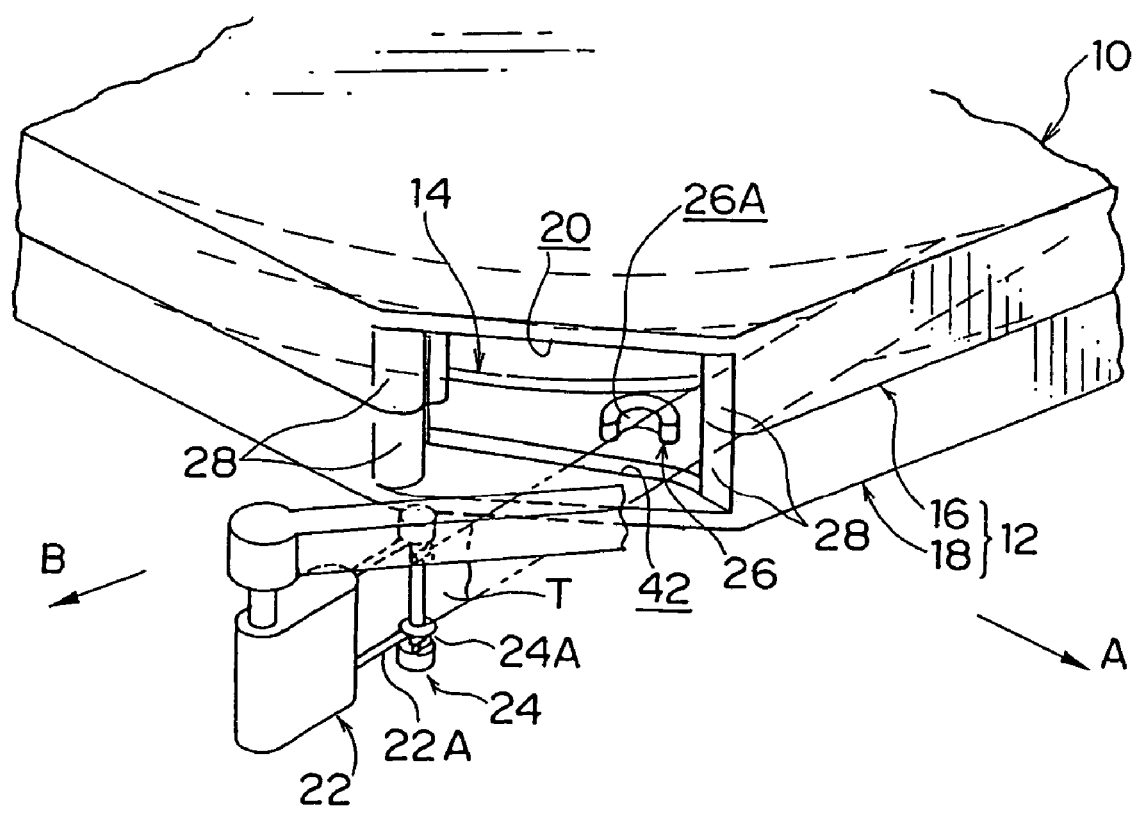
FIG. 4 is a perspective view showing a state in which the opening, which forms the recording tape cartridge relating to the embodiment of the present invention, is opened.

As shown in FIGS. 2 through 4, the opening 20 is formed by cutting off a corner portion, in the direction of loading the recording tape cartridge 10 into the drive device, of the case 12 as described above. The plane of opening of the opening 20 is thereby directed in the direction of arrow A and in the direction of arrow B. Thus, the chucking mechanism 22 can chuck the leader pin 24 by accessing the leader pin 24 from the direction of arrow A, the direction of arrow B, or a direction between the direction of arrow A and the direction of arrow B.

The area over which the pin stands 26, which hold the leader pin 24, can be set, can thereby be broadened. Namely, because the region over which the chucking mechanism 22 can chuck the leader pin 24 is wide, the position at which the pin stands 26 are to be set can be determined in accordance with the specifications of the drive device which is chucking from the direction of arrow A or from the direction of arrow B. Therefore, the degrees of freedom in designing the drive device can be increased.

Screw bosses 28 are formed at the edges of the opening 20, i.e., at the final end portions of the cut-out peripheral walls 16A, 18A of the upper case 16 and the lower case 18. Screws (unillustrated) are screwed into the screw bosses 28 from beneath, so as to fix (join) the upper case 16 and the lower case 18 together.

In this way, at the corner portions at the both sides of the opening 20, which are prescribed by the free ends of the peripheral walls 16A, 18A and which are disadvantageous from the standpoint of strength and which can be easily struck against the ground surface or the like if the case 12 is dropped, even if the case 12 is dropped, there is no deformation or buckling and no positional offset due to the weight of the entire recording tape cartridge 10.

The diameter of the thread of the screw is, for example, ($\phi$ 2.0 mm, and the outer diameter of the screw boss 28 is $\phi$ 4.0 mm. Further, instead of screws, projections may be made to project from the upper case 16 at positions corresponding to the screw bosses 28, and fit-together holes which fit together with these projections may be provided at the lower case 18, and the projections and fit-together holes may be fit-together. However, in this case, it is preferable that the upper case 16 and the lower case 18 be fastened together by screws at places within a radius of 30 mm from these regions of fitting-together. Moreover, the surfaces of the peripheral walls 16A, 18A which oppose one another (the corner portions at the both sides of the opening 20) may be fixed by welding.

At the area where the pin stands 26 are set (i.e., in a vicinity of the opening 20), the plate thickness of each of the upper case 16 and the lower case 18 is 2 mm, which is thicker than the other areas. Moreover, the case 12 (the upper case 16 and the lower case 18) is formed from a polycarbonate (PC) material. Note that the thickness of groove bottom portions of first guide grooves 20 and second guide grooves 42, which will be described later, of the case 12 is from 0.5 mm to 1 mm.

This is in order to improve the strength in vicinities of the pin stands 26 which are the holding (positioning) positions of the leader pin 24 which is most important in the functions of the recording tape cartridge 10 (i.e., which should be correctly anchored by the chucking mechanism 22 at the time when the magnetic tape T is to be pulled-out), and is in order to prevent positional offset from arising due to the impact caused by dropping or the like.

The angle of inclination of the plane of opening of the opening 20 with respect to the direction of arrow A is determined in accordance with the need to identify (recognize) the recording tape cartridge 10 in a library device. Namely, a library device is a device which houses a plurality of recording tape cartridges 10 and which automatically (i.e., without the assistance of a human) loads the recording tape cartridge 10 into and removes the recording tape cartridge 10 from a drive device. When plural types of recording tape cartridges 10 and drive devices are being handled, it is necessary to recognize the generation, the recording capacity, and the like of the recording tape cartridge 10, and the angle of inclination of the plane of opening of the opening 20 can be utilized in such recognition.

In this way, the opening 20, which is for the pulling-out of the magnetic tape T and which is formed in consideration of strength as described above, also serves as an identifying portion in a library device due to the angle of inclination of the plane of opening of the opening 20 (specifically, the angle of inclination of the ceiling plate or the bottom plate which prescribe the top and bottom of the opening 20). Thus, it is possible to prevent the structure of a metal mold for the case 12 from becoming complex, and to prevent the strength of the case 12 from being insufficient and the dust-proof ability of the case 12 from deteriorating, which would be of concern if the opening 20 and an identifying portion were provided separately (e.g., if one or plural through-holes were provided as the identifying portion).

(Structure of Door)

The above-described opening 20 is opened and closed by a door 30 which serves as a cover member. The door 30 is formed in the shape of a rectangular plate. The plate width (the height) of the door 30 is substantially the same as the opening height of the opening 20. The plate length of the door 30 is greater than the opening width of the opening 20. Namely, the door 30 can close the opening 20.

A pair of upper and lower guide pins 32 project out from the transverse direction end portions at one longitudinal direction end portion of the door 30. A pair of upper and lower guide pins 34 project out from the transverse direction end portions at the other longitudinal direction end portion of the door 30. Further, an abutment portion 36, which is triangular as seen in plan view, extends across the transverse direction at the outer surface of the end portion of the door 30 at the side where the guide pins 32 are provided. A spring catching groove 38 is provided at the central portion of the inner surface of the door 30.

The door 30 is formed of, for example, polyoxymethylene (POM) resin which has excellent wear resistance and a low coefficient of friction as compared to the case 12 which is formed from PC. Moreover, the guide pins 32, 34 may be formed separately from the main body of the door 30. In this case, the guide pins 32, 34 may be formed from a resin material such as polyamide (PA), polytetrafluoroethylene (PTFE), polyethylene (PE) or the like, or from a metal material, or from a material whose main component is such a resin material or a metal material. Further, the case 12 may be formed of acrylonitrile butadiene styrene (ABS) or a metal material instead of PC. However, if the case 12 is formed from a metal material, the guide pins 32, 34 must be formed of a resin material in consideration of the wear characteristics and sound prevention.

The door 30 can move, by a guide mechanism provided at the case 12, between a position at which the door 30 closes the opening 20 and a position at which the door 30 opens the opening 20.

Figure 5:
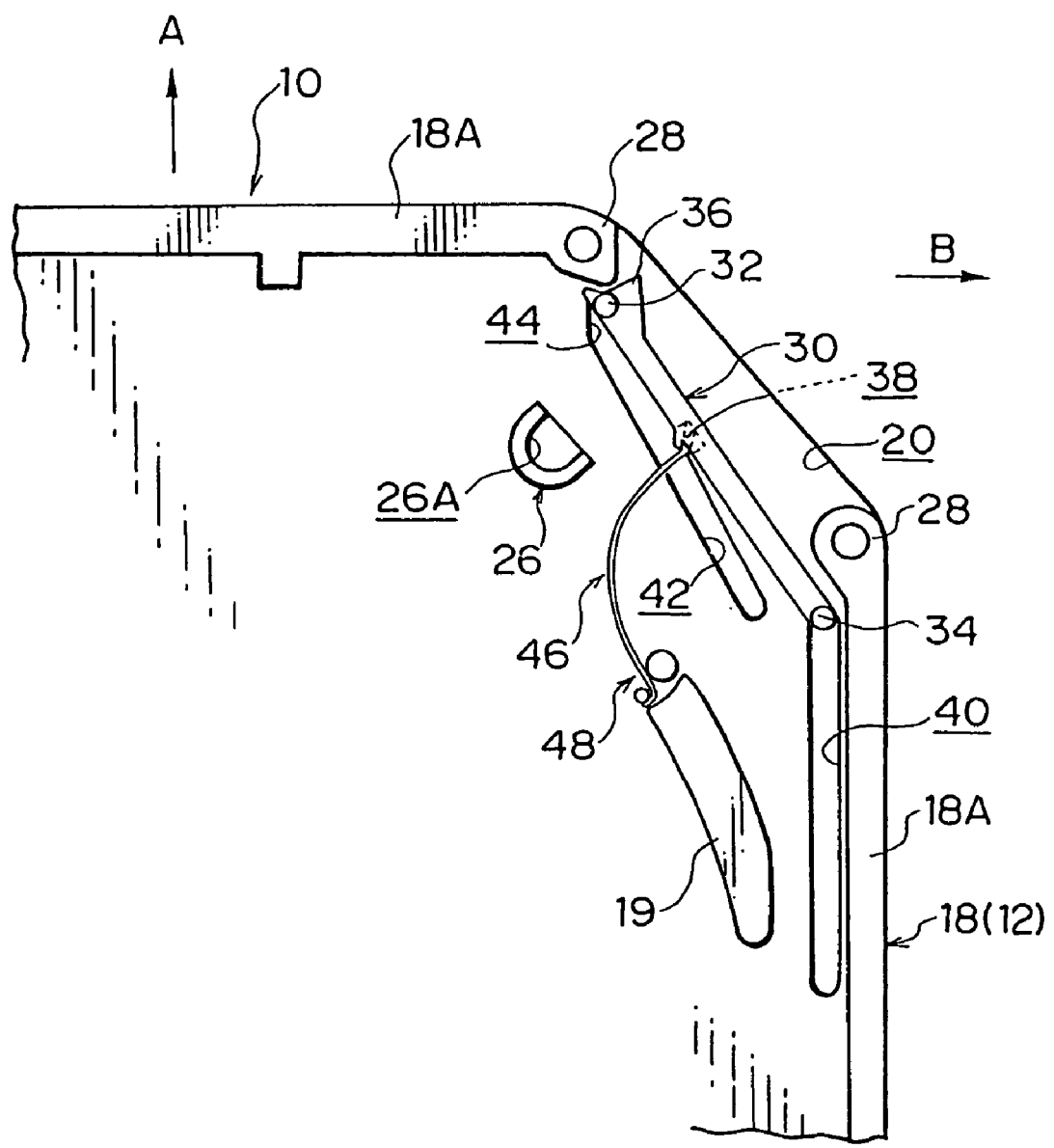
FIG. 5 is a plan view, as seen with an upper case removed, showing a state in which the opening, which forms the recording tape cartridge relating to the embodiment of the present invention, is closed by the door.
Figure 6:
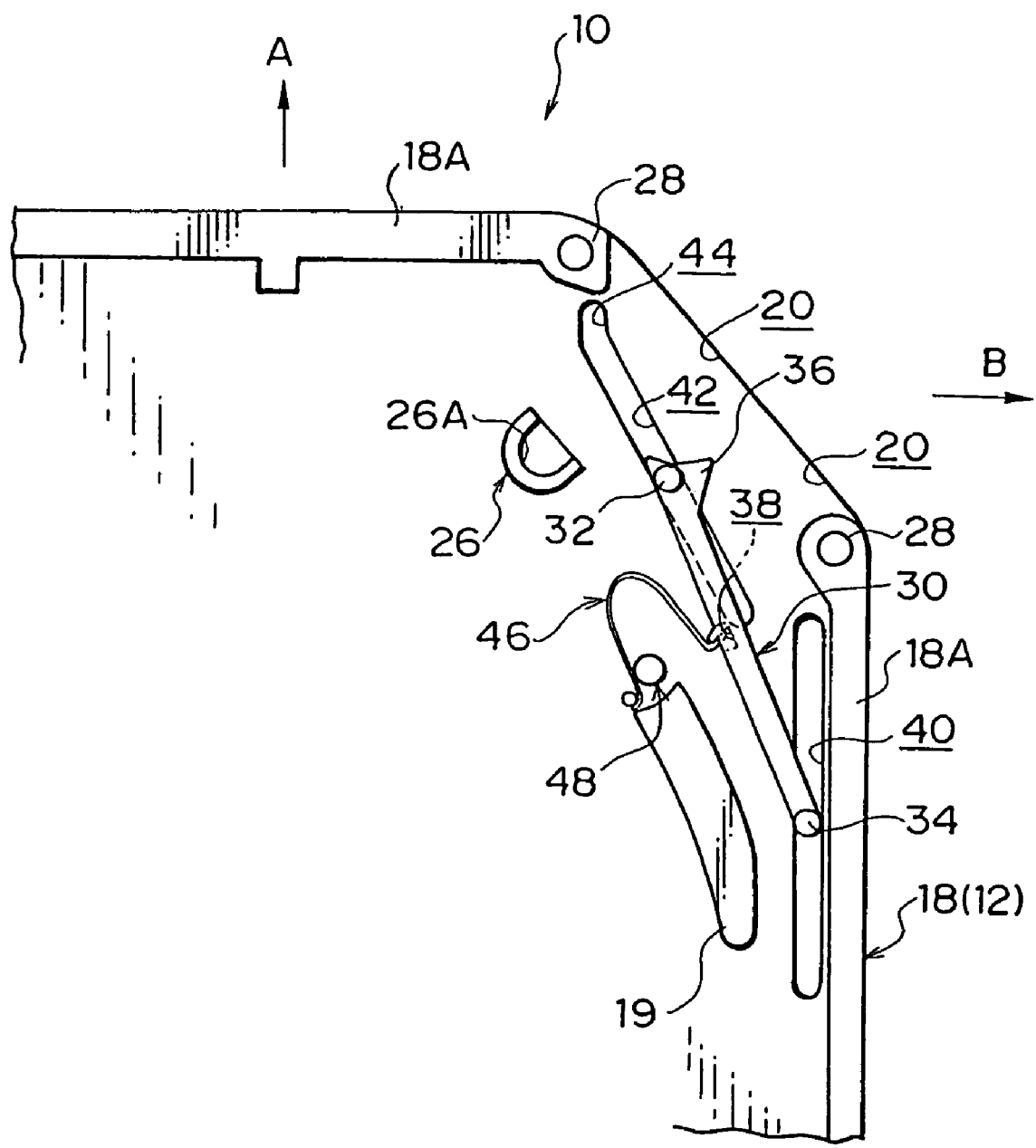
FIG. 6 is a plan view, as seen with the upper case removed, showing a state in the midst of opening or closing the opening which forms the recording tape cartridge relating to the embodiment of the present invention.
Figure 7:
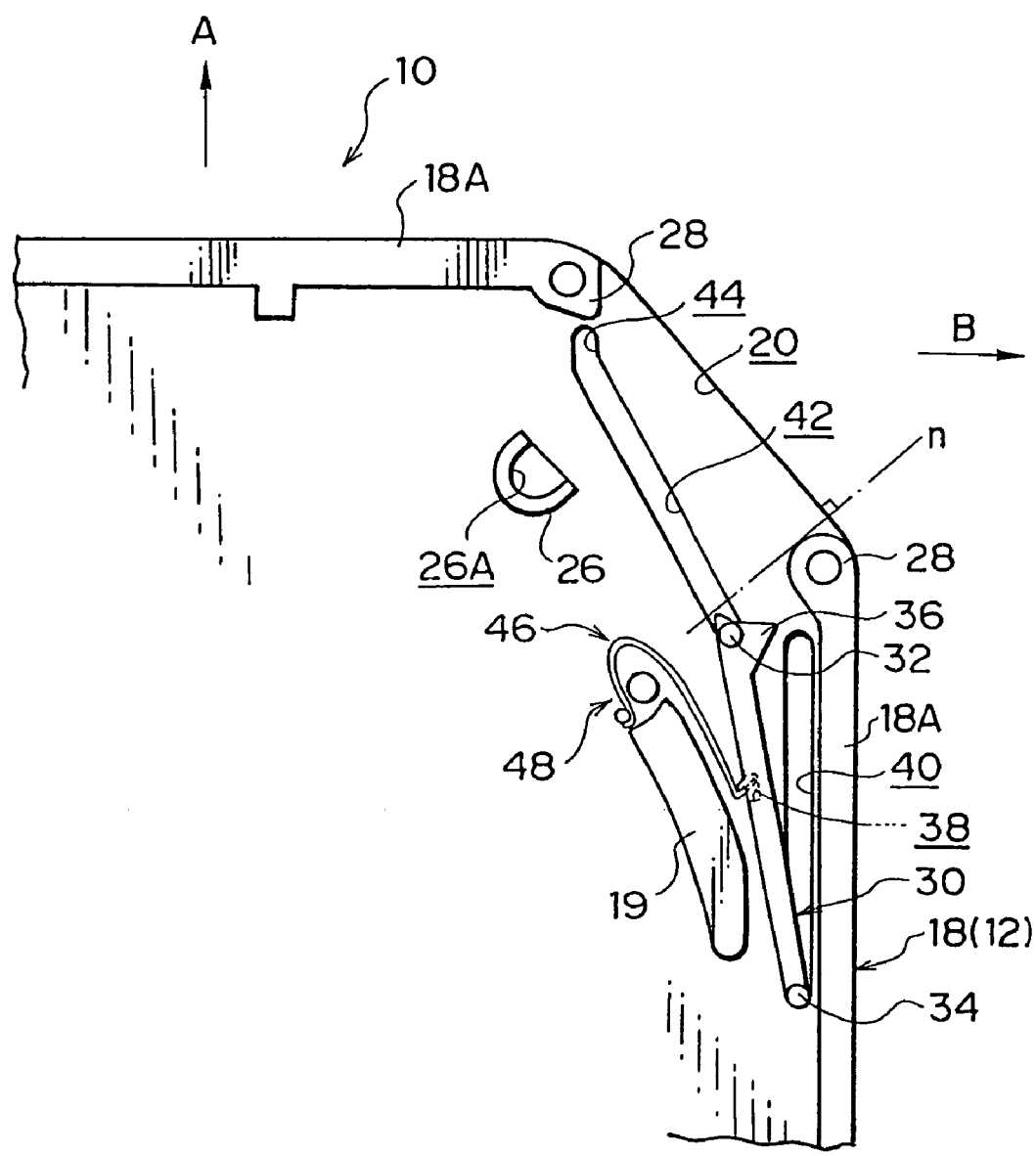
FIG. 7 is a plan view, as seen with the upper case removed, showing a state in which the opening, which forms the recording tape cartridge relating to the embodiment of the present invention, is opened.
Figure 8A:
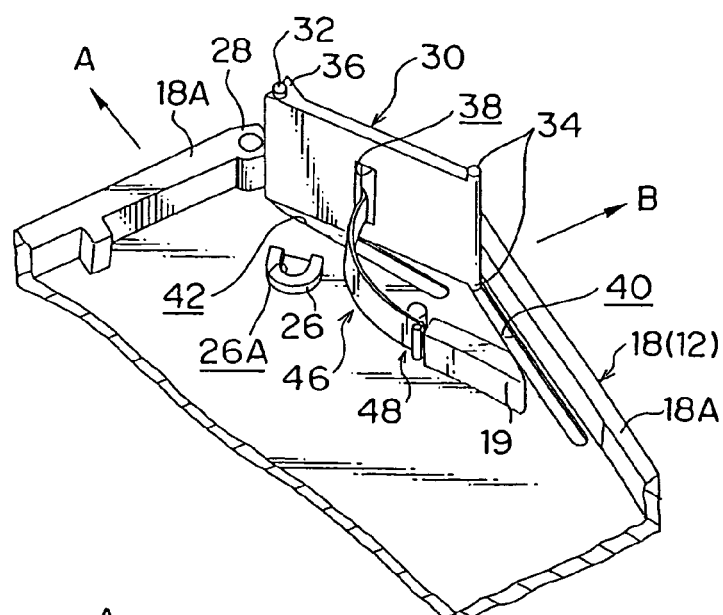
FIG. 8A is a view, as seen with the upper case removed, showing a process of opening the opening which forms the recording tape cartridge relating to the embodiment of the present invention, and is a perspective view showing a state in which the opening is closed.
Figure 8B:
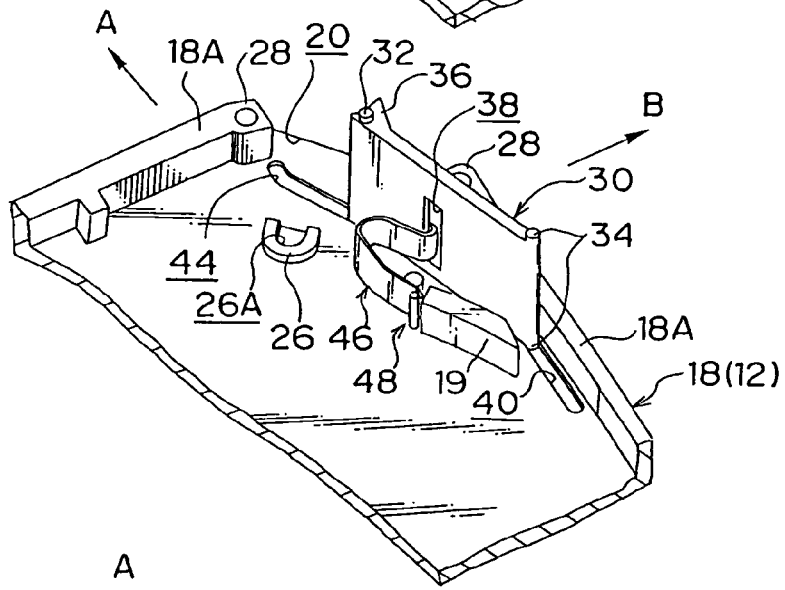
FIG. 8B is a view, as seen with the upper case removed, showing the process of opening the opening which forms the recording tape cartridge relating to the embodiment of the present invention, and is a perspective view showing a state in the midst of opening or closing the opening.
Figure 8C:
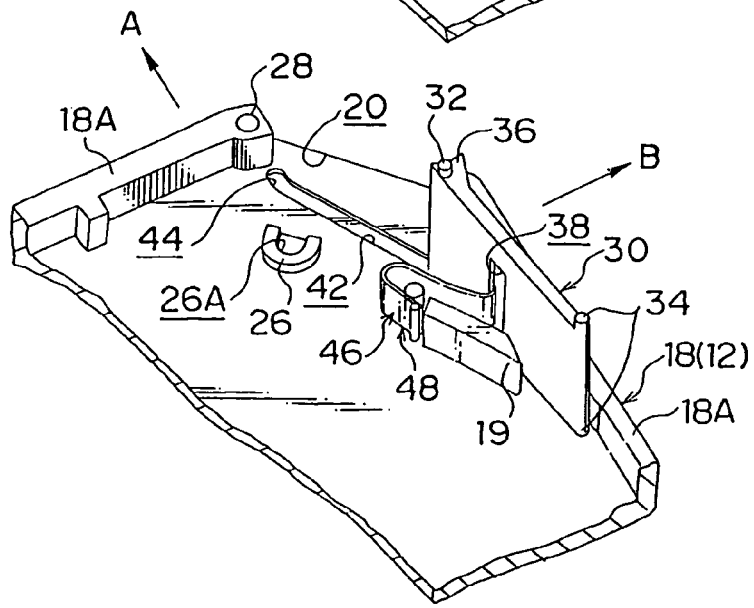
FIG. 8C is a view, as seen with the upper case removed, showing the process of opening the opening which forms the recording tape cartridge relating to the embodiment of the present invention, and is a perspective view showing a state in which the opening is opened.

Specifically, as shown in FIGS. 5 through 7, the pair of upper and lower first guide grooves 40, which are disposed so as to oppose one another, are provided along the direction of arrow A in vicinities of the peripheral walls 16A, 18A, which run along the direction of arrow A, of the upper case 16 and the lower case 18. The proximal ends of the first guide grooves 40 are slightly rearward of the rear side screw bosses 28, and the lengths of the first guide grooves 40 are slightly shorter than the plate length of the door 30. The guide pins 34 of the door 30 are inserted into the interiors of the upper and lower first guide grooves 40, and the guide pins 34 are guided along the longitudinal directions of the first guide grooves 40.

The pair of upper and lower second guide grooves 42, which are inclined at a predetermined angle with respect to the direction of arrow A and are disposed so as to oppose one another, are provided between the pin stands 26 and the edge of the opening 20 of the upper case 16 and the lower case 18. The proximal ends and the final ends of the second guide grooves 42 are disposed in vicinities of the front and rear screw bosses 28, and the lengths of the second guide grooves 42 are slightly shorter than the plate length of the door 30. The guide pins 32 of the door 30 are inserted into the interiors of the second guide grooves 42. While the guide pins 32 are pivoted around the guide pins 34, the guide pins 32 are guided along the longitudinal directions of the second guide grooves 42.

In this way, in the state in which the guide pins 32 are positioned at the front ends of the second guide grooves 42 and the guide pins 34 are positioned at the front ends of the first guide grooves 40, one end portion of the door 30 abuts the front side screw boss 28, and the other end portion of the door 30 abuts the peripheral walls 16A, 18A in vicinities of the first guide grooves 40, and the door 30 closes the opening 20 from the inner side (see FIG. 5 through FIG. 8A).

Further, as shown in FIG. 6 through FIG. 8B, the door 30 moves rearward while rotating clockwise around the guide pins 34 as seen in plan view, with the door 30 being guided at the guide pins 32, 32 by the first guide grooves 40 and the second guide grooves 42 respectively, and the guide pins 32 are positioned at the rear ends of the second guide grooves 42. Simultaneously, in the state in which the guide pins 34 are positioned at the rear ends of the first guide grooves 40, the door 30 is accommodated within the case 12 so as to be alongside and substantially parallel to the peripheral walls 16A, 18A, and the door 30 opens the opening 20 (see FIGS. 7 and 8C).

The positions of the final ends of the second guide grooves 42 are determined such that, in the aforementioned state, one end portion of the door 30 (i.e., the end portion at the abutment portion 36 side) does not project further forward than a normal line n of the plane of opening (edge portion) of the opening 20 which normal line n is tangent to the rear side screw boss 28. In this way, the door 30 which is at the position of opening the opening 20 does not interfere with the entry of the chucking mechanism 22. Moreover, the angle of inclination of the second guide grooves 42 with respect to the direction of arrow A is determined in accordance with the requirements in the operating of the door 30. In the present embodiment, as described above, the angle of inclination of the second guide grooves 42 with respect to the direction of arrow A does not coincide with the angle of inclination of the plane of opening of the opening 20 with respect to the direction of arrow A, which latter angle of inclination is determined in accordance with the requirements in light of its function as an identifying portion as described above. Namely, in the present embodiment, the plane of opening of the opening 20 and the second guide grooves 42 are not parallel. However, in another embodiment, the plane of opening of the opening 20 and the second guide grooves 42 may be parallel.

In the present embodiment, by disposing the rear ends of the second guide grooves 42 further toward the inner side of the case 12 (i.e., further in the direction opposite to the direction of arrow B) than the front ends of the first guide grooves 40, the second guide grooves 42 are not exposed to the exterior when the opening 20 is in the closed state. In other words, the second guide grooves 42 are formed at the inner side of the door 30 which is at the position of closing the opening 20. Therefore, when the magnetic tape T is not in use (i.e., when the magnetic disk cartridge 10 is being stored or being transported), dirt and dust do not accumulate in the interiors of the second guide grooves 42.

Further, in order to operate the door 30 smoothly, the transverse direction clearance between each of the guide pins 32, 34 and the first guide grooves 40 and the second guide grooves 42 is preferably about 0.05 mm to 0.4 mm at one side when supposing that the central lines thereof coincide (i.e., is preferably about 0.1 mm to 0.8 mm at the both sides). In particular, a clearance of 0.2 mm is suitable because the operation can be made to be smooth while joggling of the door 30 can be prevented. Further, the clearance between the top and bottom end surfaces of the door 30 and the inner surfaces (the ceiling plate and the bottom plate) of the case 12 is preferably about 0.05 mm to 0.2 mm at one side.

Moreover, a bent portion 44, which bends outwardly with respect to the longitudinal direction of the second guide groove 42, is formed at the front end portion of each second guide groove 42. The bent portion 44 is formed along the direction of arrow A. In the state in which the door 30 closes the opening 20, the guide pins 32 of the door 30 enter into the interiors of the bent portions 44 due to urging force of a plate spring 46 which will be described later.

In this way, even if a user attempts to operate the door 30 (the abutment portion 36) in the direction of the plane of opening of the opening 20 when the opening 20 is closed by the door 30, the guide pins 32 catch on the bent portions 44 (the frictional resistance between the guide pins 32 and the bent portions 44 is greater than the component of force in the direction of moving the guide pins 32 along the bent portions 44). The door 30 cannot be easily opened, i.e., the function of a simple lock is provided.

Note that, in the present embodiment, the bent portions 44 are formed along the direction of arrow A. However, the angle of inclination of the bent portions 44 with respect to the longitudinal direction of the second guide grooves 42 can be set to an arbitrarily value between 50° and 150°, and the bent portions 44 can also be formed so as to bend in a curved shape.

The door 30 is urged in the direction of closing the opening 20 by the plate spring 46 which serves as an urging member. One end portion of the plate spring 46 is anchored on the spring catching groove 38 of the door. The other end portion of the plate spring 46 is anchored on an anchor portion 48 which projects from the inner surface of the case 12. The anchor portion 48 is positioned substantially at the front of the play regulating wall 19 which is in a vicinity of the front end of the first guide groove 40. Interference between the reel 14 and the leader pin 24 is prevented by making the distance from the center of the gear opening 18B to the anchor portion 48 be longer than the distance from the center of the gear opening 18B to the inner surface of the play regulating wall 19 and be shorter than the distance from the center of the gear opening 18B to the pin stand 26.

Usually, the door 30 is positioned at the position of closing the opening 20, due to the urging force of the plate spring 46. Namely, due to the urging force of the plate spring 46, the guide pins 32 of the door 30 enter into the bent portions 44 of the second guide grooves 42, and the guide pins 34 are positioned at the front end portions of the first guide grooves 40.

When the opening 20 is to be opened, the abutment portion 36 of the door 30 is abutted by a picking portion 50A of a door opening/closing arm 50 which is provided at the drive device and which will be described later. Due to the operation of inserting the case 12, opening force along the bent portions 44 is applied to the door 30. Due to this opening force, as described above, the door 30 moves while rotating while the guide pins 32, 34 thereof are guided in the first guide grooves 40 and the second guide grooves 42.

Next, operation of the present embodiment will be described with reference to FIGS. 9 through 12.

When the recording tape cartridge 10 having the above-described structure is not in use (is being stored or transported or the like), the opening 20 is closed from the inner side by the door 30. The door 30 is locked simply by the guide pins 32 thereof entering into the bent portions 44 of the second guide grooves 42 due to the urging force of the plate spring 46.

Namely, even if a user attempts to move the door 30 (the abutment portion 36) along the plane of opening of the opening 20, the guide pins 32 engage with the groove walls of the bent portions 44, and the door 30 does not move. Thus, the closed state of the opening 20 is maintained, and the opening 20 cannot be opened intentionally by the user.

Figure 9:
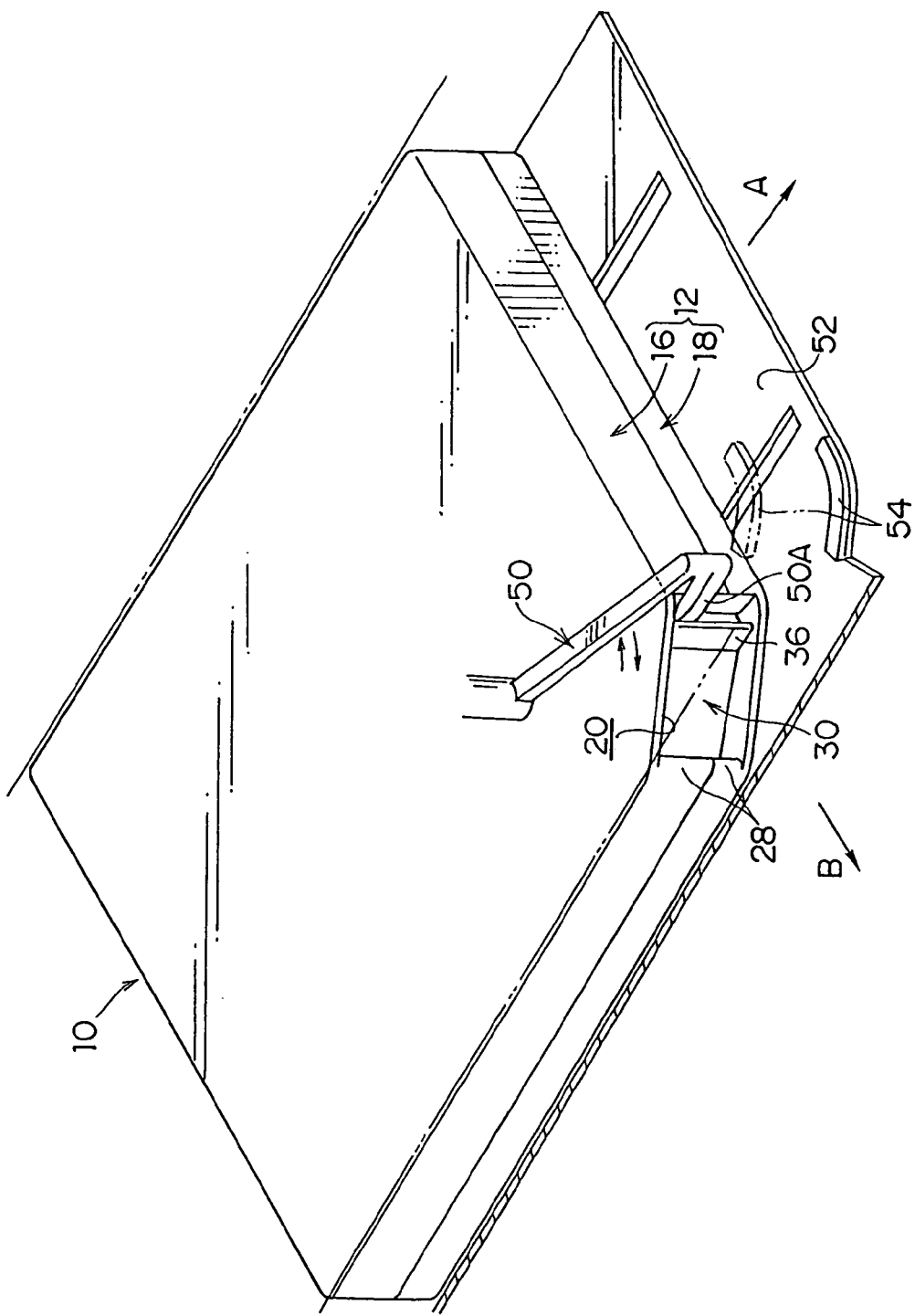
FIG. 9 is a perspective view showing the relationship between the recording tape cartridge relating to the embodiment of the present invention, and a door opening/closing arm of a drive device.
Figure 10:
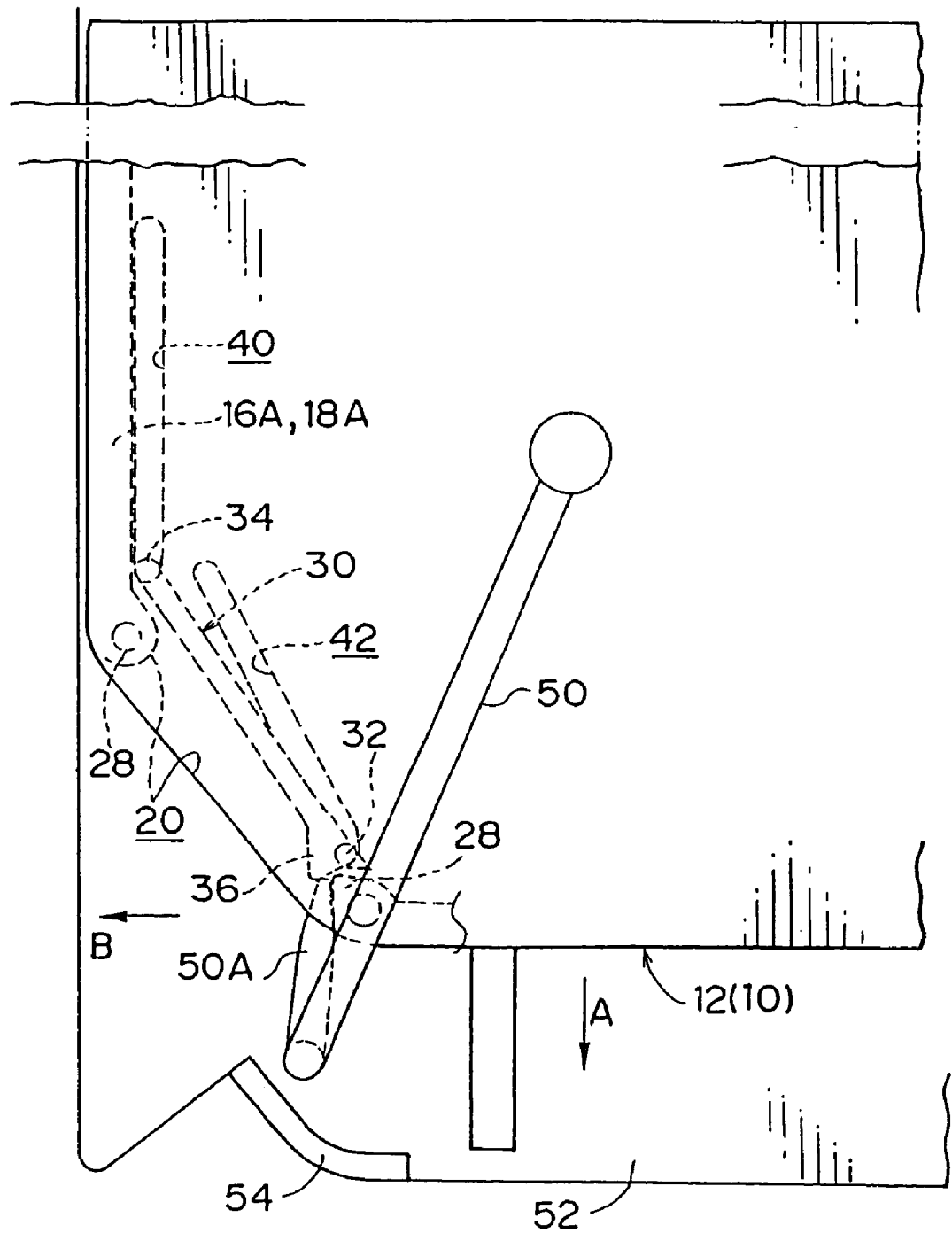
FIG. 10 is a plan view showing a state in which the door, which forms the recording tape cartridge relating to the embodiment of the present invention, is operated by the door opening/closing arm of the drive device.

On the other hand, when the magnetic tape T is to be used, the recording tape cartridge 10 is loaded into the drive device along the direction of arrow A. Accompanying this loading, as shown in FIGS. 9 and 10, the picking portion 50A of the door opening/closing arm 50, which is swingably supported above a bucket 52 of the drive device, abuts the abutment portion 36 of the door 30.

Figure 11:
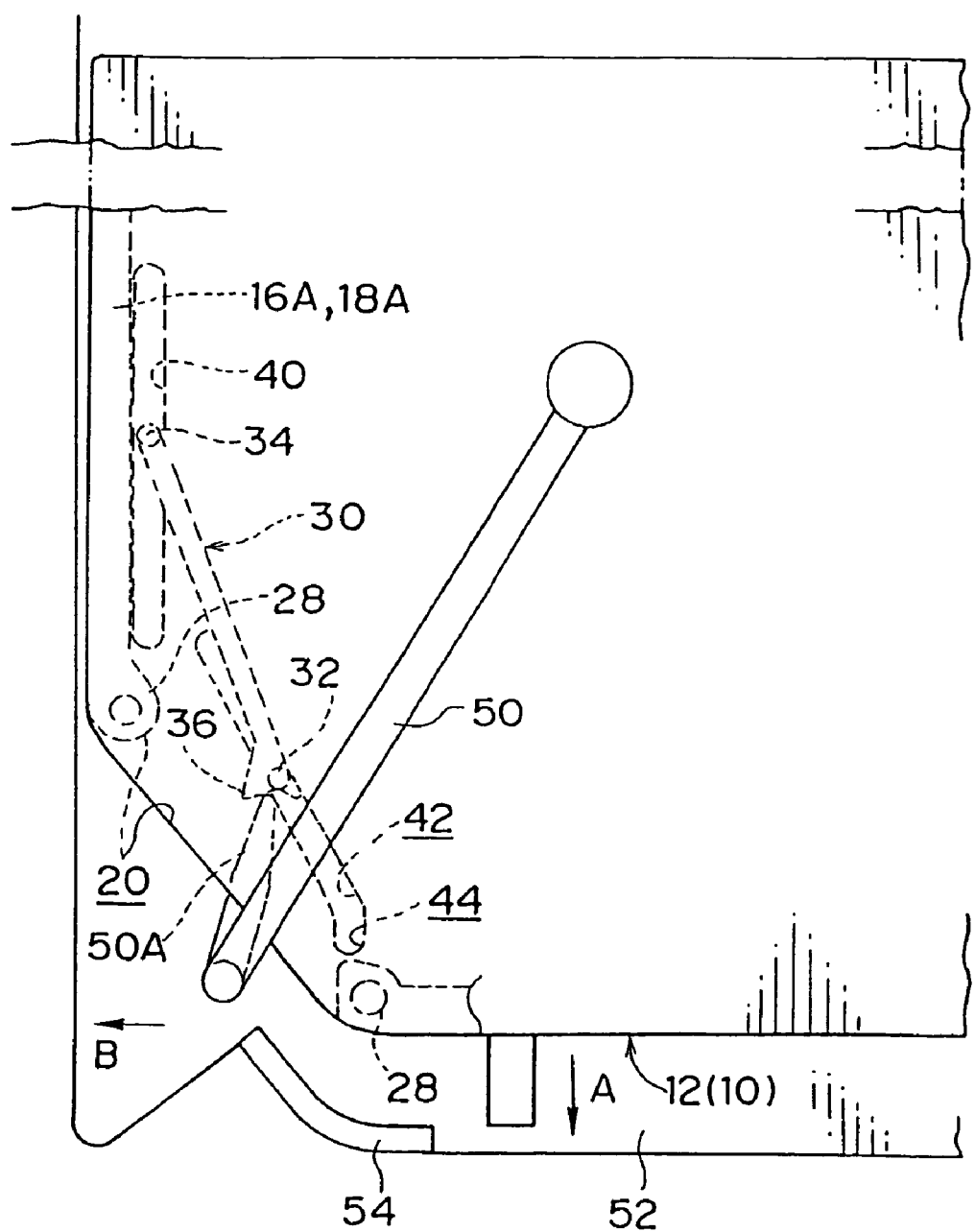
FIG. 11 is a plan view showing a state in which the door, which forms the recording tape cartridge relating to the embodiment of the present invention, is operated by the door opening/closing arm of the drive device.

When the recording tape cartridge 10 (the case 12) is pushed in further, due to this pushing-in force, as shown in FIG. 11, while the door opening/closing arm 50 pivots clockwise as seen in plan view, the picking portion 50A thereof slides the door 30 (the abutment portion 36) in the direction of opening the opening 20. Namely, the door 30 moves substantially rearward while being guided by the first guide grooves 40 and the second guide grooves 42 and rotated around the guide pins 34.

Figure 12:
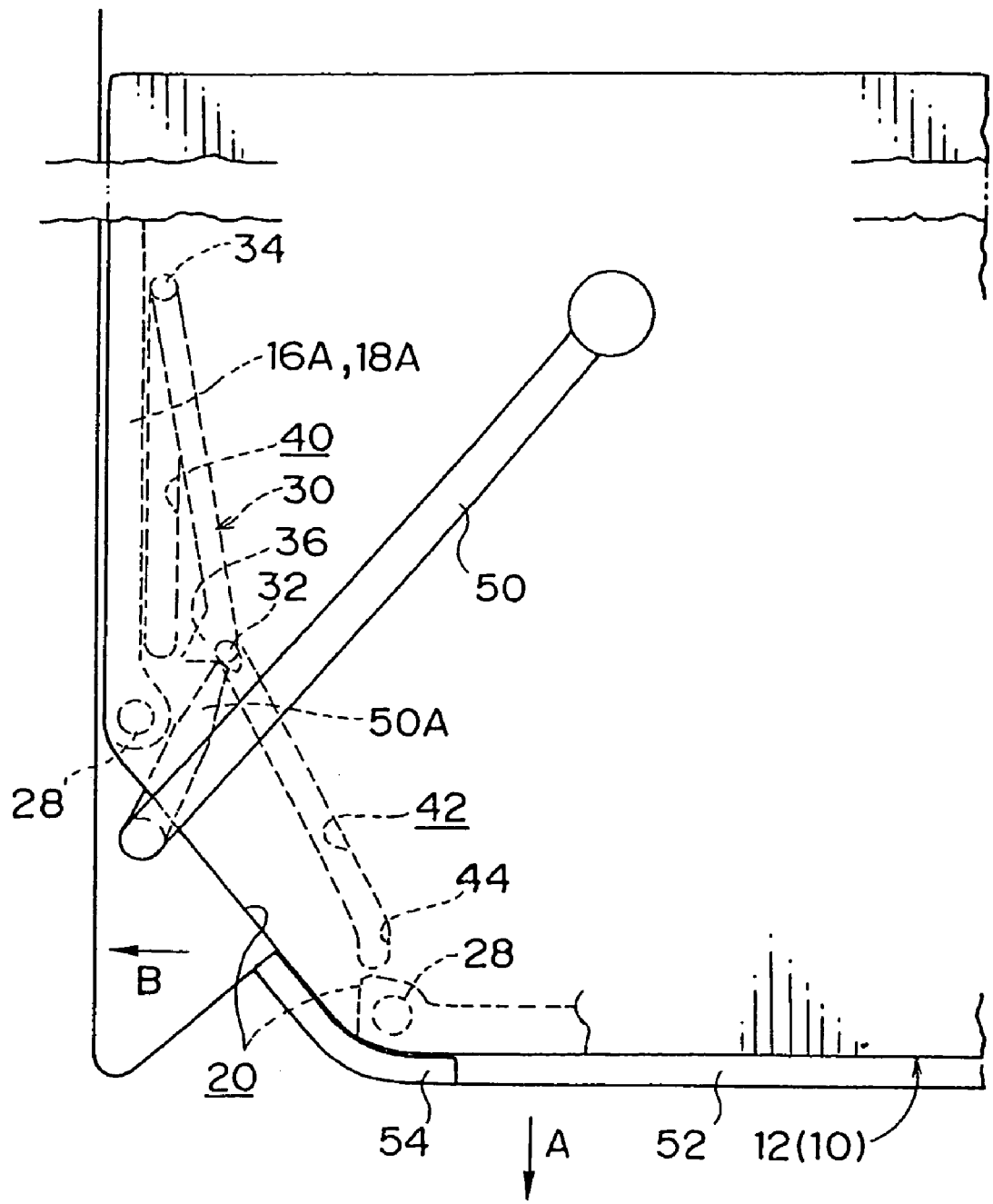
FIG. 12 is a plan view showing a state in which the door, which forms the recording tape cartridge relating to the embodiment of the present invention, is operated by the door opening/closing arm of the drive device.

Then, as shown in FIG. 12, when the front right corner portion of the case 12, at which corner portion the opening 20 is formed, abuts a stopper 54 of the bucket 52, the opening 20 is completely opened. In this state, the door 30 is accommodated within the case 12 so as to be alongside and substantially parallel to the peripheral walls 16A, 18A which run along the direction of arrow A.

Further, due to the inclined corner portion of the case 12 abutting the stopper 54 which has an inclined surface corresponding to the inclined corner portion of the case 12, the depth of loading the case 12 into the bucket 52 along the direction of arrow A is regulated, and the position of the case 12 in the direction of arrow B as well is regulated. In this state, the bucket 52 is lowered, and the recording tape cartridge 10 is accurately positioned in the vertical direction and the horizontal direction within the drive device.

Further, accompanying this lowering of the bucket 52, the drive gear (not illustrated) of the drive device meshes with the reel gear of the reel 14, such that the reel 14 is set in a state in which it can be driven to rotate. The hooks 22A of the chucking mechanism 22 (see FIG. 4) enter into the case 12 from the opening 20 which has been opened. The hooks 22A anchor on the leader pin 24 which is positioned and held at the pin stands 26.

The chucking mechanism 22, which is anchoring the leader pin 24, pulls the leader pin 24 out from the case 12, and pulls the magnetic tape T out from the case 12. Further, while pulling the magnetic tape T out along a predetermined tape path, the chucking mechanism 22 leads the leader pin 24 to a hub of an unillustrated take-up reel, and, together with the hooks 22A, makes the leader pin 24 be accommodated and held at an accommodating portion of the hub.

In this state, by driving the reel 14 and the take-up reel to rotate synchronously, recording of information or playback of information can be carried out while the magnetic tape T is being successively taken up onto the hub of the take-up reel.

When the magnetic tape T is to be rewound, the reel 14 and the take-up reel are driven to rotate reversely. When the magnetic tape T has been completely rewound, the chucking mechanism 22 causes the leader pin 24 to be held at the pin stands 26. When the chucking mechanism 22 is pulled out from the opening 20, the bucket 52 is raised, and the positioned state of the recording tape cartridge 10 (the case 12) is cancelled.

In this state, the recording tape cartridge 10 is moved in the direction opposite to the direction of arrow A by an unillustrated ejecting mechanism. While the door 30 is slid in the direction of closing the opening 20 by the urging force of the plate spring 46, the door 30 pivots the door opening/closing arm 50, whose picking portion 50A is abutting the abutment portion 36 of the door 30, counterclockwise as seen in plan view.

At this time as well, the door 30 moves substantially forward while being guided by the first guide grooves 40 and the second guide grooves 42 and rotating around the guide pins 34. When the door 30 returns to its initial state of completely closing the opening 20, the door opening/closing arm 50 as well returns to its initial position so as to be set in a state of being able to receive the next recording tape cartridge 10 to be loaded in.

Here, because the opening 20 is formed by cutting off a loading side corner portion of the rectangular case 12, the plane of opening of the opening 20 is directed in the direction of arrow A and in the direction of arrow B (the plane of opening is inclined with respect to the direction of arrow A). Namely, the chucking mechanism 22 can access the leader pin 24 from the front surface side of the case 12 which front surface side is directed in the direction of arrow A, and there is no need for the chucking mechanism 22 to access the leader pin 24 from a position further outward (further in the direction of arrow B) than the arrow B side peripheral walls (side walls) 16A, 18A.

Thus, in the drive device, the path for pulling-out the magnetic tape T can be made to be the shortest. Further, there is no need for a drive mechanism for making the chucking mechanism 22 move around (i.e., non-rectilinearly) from the arrow B side of the case 12. The drive device can be made more compact and less expensive.

The door 30 is guided by the first guide grooves 40 and the second guide grooves 42 and moves substantially rearward or substantially forward while being rotated so as to move around the outer side of the reel 14 and the leader pin 24 (the pin stands 26), between the position of closing, from the inner side, the opening 20 having the plane of opening inclined with respect to the direction of arrow A, and the position of opening the opening 20 by being set alongside and substantially parallel to the arrow B side peripheral walls 16A, 18A of the case 12.

Thus, in the processes of the door 30 opening and closing the opening 20 (including the opening state and the closing state), the door 30 does not jut out from the region defined by the outer shape of the case (does not jut out even from the cut-off corner portion of the case 12), and there is no need to provide space for the door 30 to open and close at the interior of the drive device. Namely, the space for accommodating the recording tape cartridge 10 within the drive device can be made small. Moreover, parts of the drive device (e.g., rollers for guiding the recording tape, or the like) can be disposed at the space within the drive device which space corresponds to the cut-off portion of the case 12 where the opening 20 is formed. Moreover, the door 30 is operated efficiently by being guided by the first guide grooves 40 and the second guide grooves 42, and the locus of operation of the door 30 does not interfere with the reel 14 and the leader pin 24 (the pin stands 26).

Moreover, the structure can be made simple because the door opening/closing arm 50 of the drive device operates the door 30 in the direction of opening the opening 20 while the picking portion 50A abuts the abutment portion 36, merely due to the operation of the recording tape cartridge 10 (the case 12) being loaded into the drive device. In particular, the abutment portion 36 is provided at one end portion of the door 30, which one end portion is the front end when the door 30 is in an assembled state. Namely, the abutment portion 36 is provided at a position of the door 30 which position faces the exterior from the opening 20 when the opening 20 is in an open state. Therefore, merely by the door opening/closing arm 50 being swingably supported at the bucket 52, the door opening/closing arm 50 can follow the abutment portion 36 of the door 30 whose position changes in the process of opening the opening 20.

In this way, in the recording tape cartridge 10 relating to the present embodiment, the opening 20, which enables the pull-out path of the magnetic tape T to be the shortest, can be opened and closed without the door 30, which allows the space for accommodating the recording tape cartridge 10 within the drive device to be made small, interfering with the reel 14 and the leader pin 24. Further, the door opening/closing arm 50, which serves as an opening/closing device for operating the door 30 and opening and closing the opening 20, can be made to have a simple structure.

When the path for the pulling-out of the magnetic tape T is made to be the shortest as described above, the entire path along which the magnetic tape T travels also becomes shorter as a matter of course. Thus, the wear due to contact between the magnetic tape T and a tape guide (e.g., rotatably supported rollers or the like) can be reduced.

The opening 20 is formed by cutting off a corner portion of the case 12, and is directed in the direction of arrow A and in the direction of arrow B. Thus, the range of directions over which the chucking mechanism 22 (the hooks 22A) can access the leader pin 24 is broadened, and the range of positions at which the leader pin 24 can be set within the case 12 is broadened. Further, because, as described above, the locus of operation of the door 30 does not interfere with the positions at which the leader pin 24 can realistically be set, the degrees of freedom in designing the drive device can be increased.

The door 30 is a member which is separate from the leader pin 24 which is pulled out from the case 12. Therefore, the door 30 is structured by the guide pins 32, 34, the first guide grooves 40, and the second guide grooves 42 so as to not be able to be removed from the case 12. Namely, the door 30 cannot easily come apart from the case 12 due to the impact when the recording tape cartridge 10 is dropped or the like. On the other hand, when the magnetic tape T is not in use, the opening 20 is closed by the door 30 and the leader pin 24 is accommodated within the closed case 12, and therefore, it is difficult for the leader pin 24 to be scratched or dirtied. Thus, the pulling-out and the traveling of the magnetic tape T within the drive device are not affected, and the magnetic tape T itself is not damaged. Moreover, it is difficult for a user to operate the door 30 which closes the opening 20 from the inner side.

As described above, merely by bending the front end portions of the second guide grooves 42 so as to provide the bent portions 44, the door 30 can be locked at the position of the closing the opening 20 by a simple structure. Namely, a lock mechanism, which is simple, highly-reliable, inexpensive, and has excellent production efficiency (i.e., has good moldability or machinability, assemblability, and ease of parts control), can be realized without increasing the number of parts.

Because the plate spring 46, which urges the door 30 in the direction of closing the opening 20, is provided, there is no need at the drive device for a mechanism for operating the door 30 in the direction of closing the opening 20, and the structure of the drive device can be made even more simple. Further, due to the urging force of the plate spring 46, the guide pins 32 of the door 30 can reliably be made to enter into the bent portions 44, and the aforementioned simple lock mechanism functions reliably.

Figure 13A:
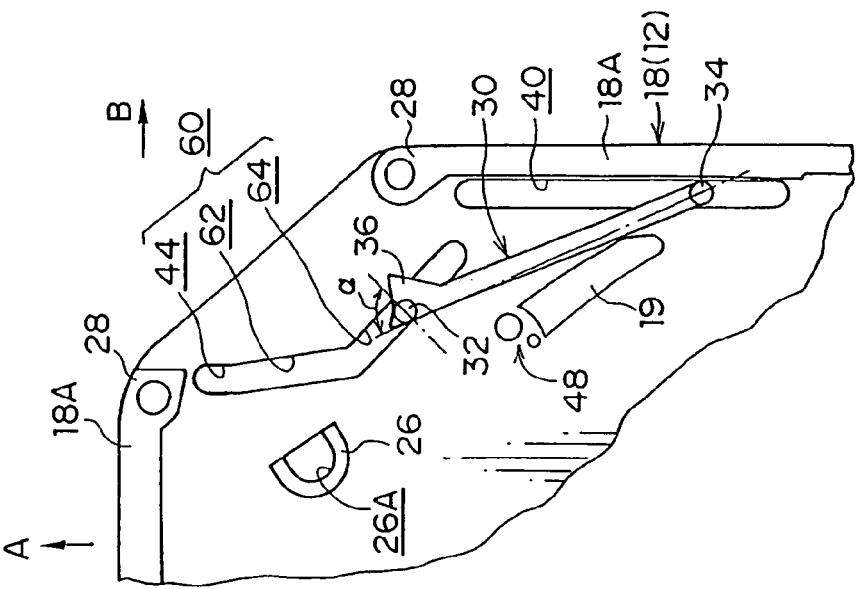
FIG. 13A is a view, as seen with the upper case removed, showing a modified example of a second guide groove which forms the recording tape cartridge relating to the embodiment of the present invention, and is a plan view showing a state in which the opening is closed.
Figure 13B:
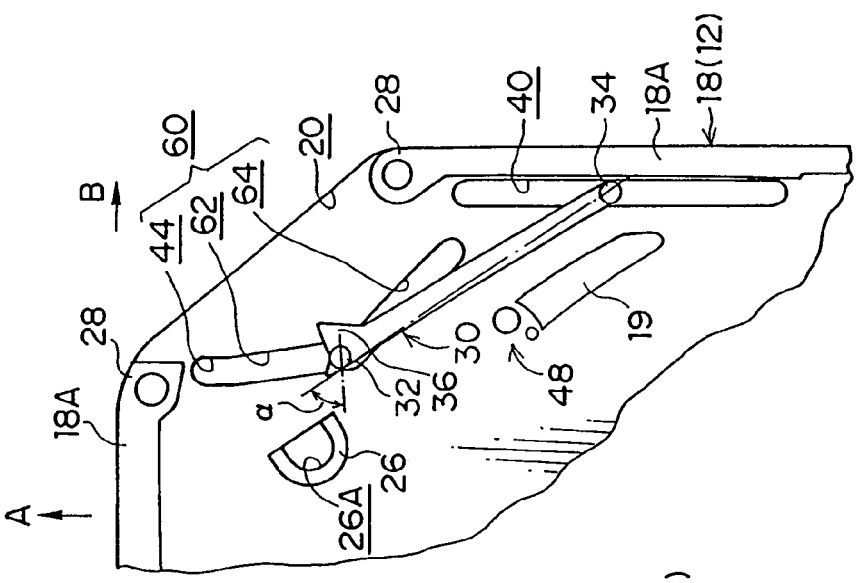
FIG. 13B is a view, as seen with the upper case removed, showing the modified example of the second guide groove which forms the recording tape cartridge relating to the embodiment of the present invention, and is a plan view showing a state in the midst of opening or closing the opening.
Figure 13C:
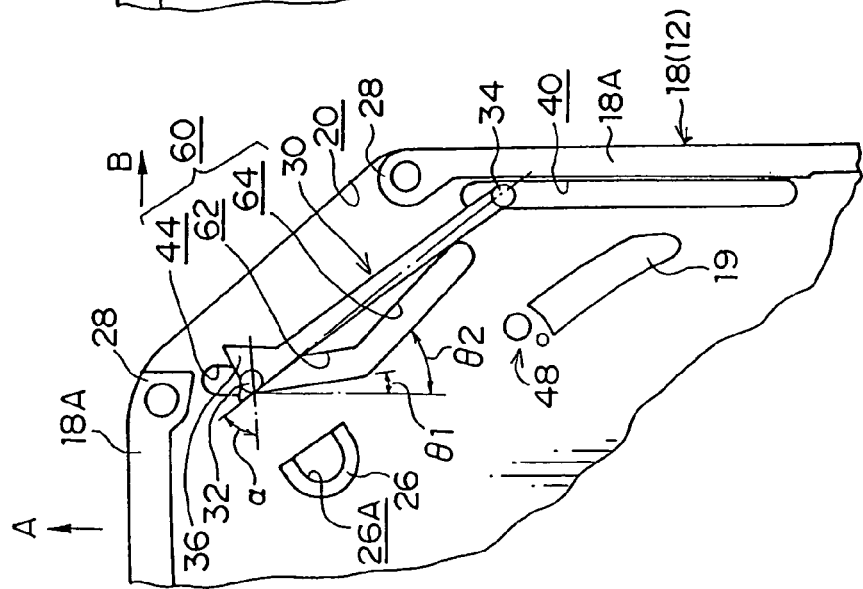
FIG. 13C is a view, as seen with the upper case removed, showing the modified example of the second guide groove which forms the recording tape cartridge relating to the embodiment of the present invention, and is a plan view showing a state in which the opening is opened.

Note that, in the above-described embodiment, the second guide grooves (cam grooves) 42, which are for regulating rotation of the door 30 around the guide pins 34, are formed to be rectilinear. However, the present invention is not limited to the same. For example, in place of the second guide grooves 42, second guide grooves 60 such as shown in FIGS. 13A, 13B, and 13C may be provided. (The plate spring 46 is not shown in FIGS. 13A, 13B, and 13C.)

The second guide groove 60 is formed in a substantial V shape, as seen in plan view, in which an angle of inclination θ1, with respect to the direction of arrow A of a first inclined portion 62 provided at the rear of the bent portion 44, is smaller than an angle of inclination θ2, with respect to the direction of arrow A of a second inclined portion 64 provided at the rear of the first inclined portion 62.

In this structure, the pressure angle of the guide pin 32 with respect to the second guide groove 60 can be made to be smaller than that in the previously-described embodiment. Namely, a pressure angle α is defined as the angle formed by an imaginary line connecting the contact point at which the guide pin 32 abuts the second guide groove 60 and the axial center of the guide pin 34 which is the center of rotation of the guide pin 32, and a normal line of the second guide groove 60 at this contact point. Generally, the pressure angle a is preferably from 15° to 60°. However, in the present embodiment, by keeping the maximum value of the pressure angle α to 55°, the door 30 can be operated even more smoothly.

Note that the both transverse direction groove walls of the second inclined portion 64 of the second guide groove 60 may be formed in circular arc shapes such that the corresponding groove walls of the first inclined portion 62 are lines tangential thereto.

Figure 14:
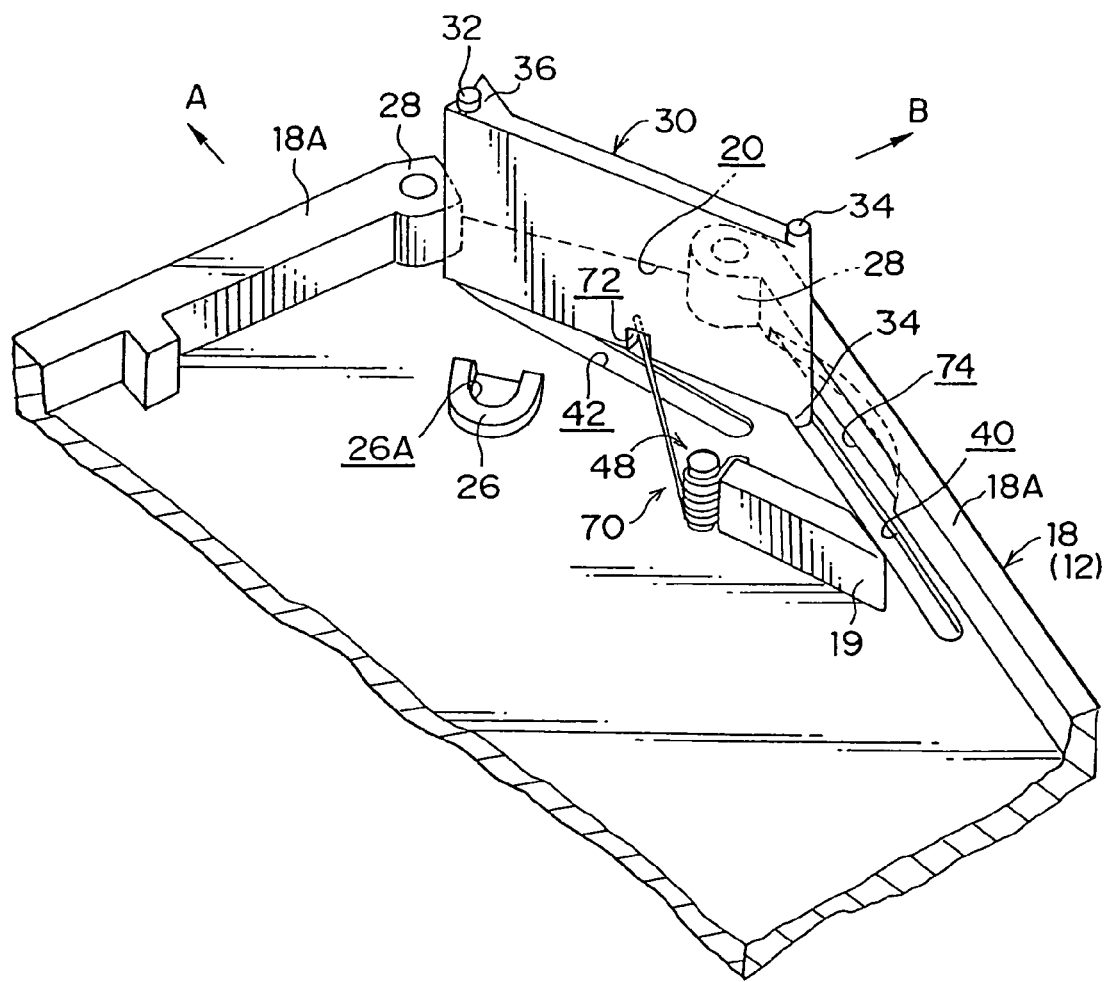
FIG. 14 is a perspective view, as seen with the upper case removed, showing a modified example of an urging member which forms the recording tape cartridge relating to the embodiment of the present invention.
Figure 15A:
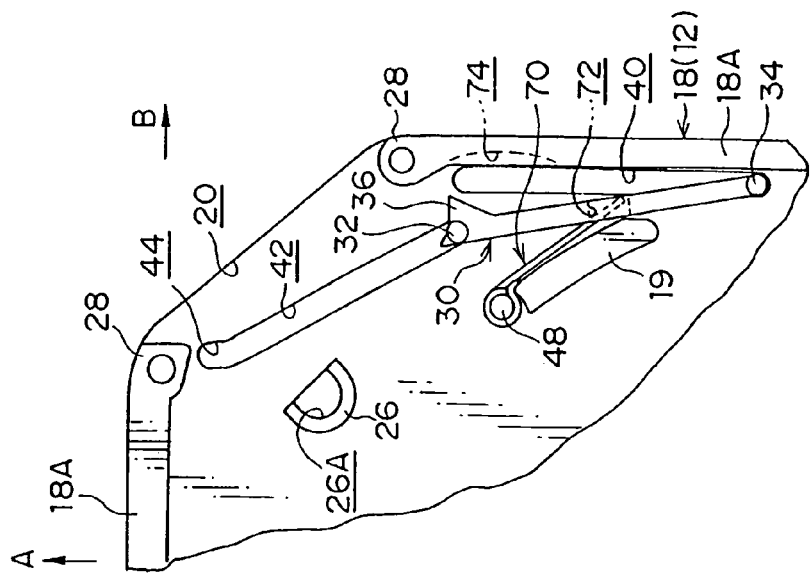
FIG. 15A is a view, as seen with the upper case removed, showing the modified example of the urging member which forms the recording tape cartridge relating to the embodiment of the present invention, and is a plan view showing a state in which the opening is closed.
Figure 15B:
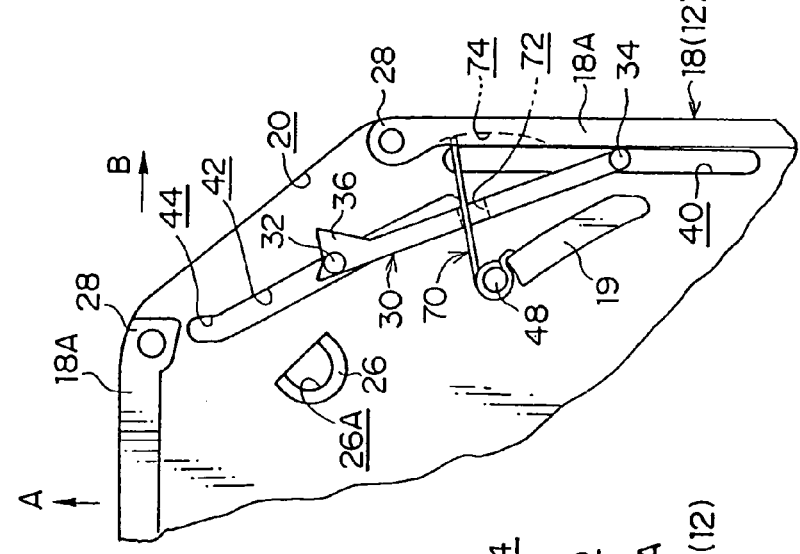
FIG. 15B is a view, as seen with the upper case removed, showing the modified example of the urging member which forms the recording tape cartridge relating to the embodiment of the present invention, and is a plan view showing a state in the midst of opening or closing the opening.
Figure 15C:
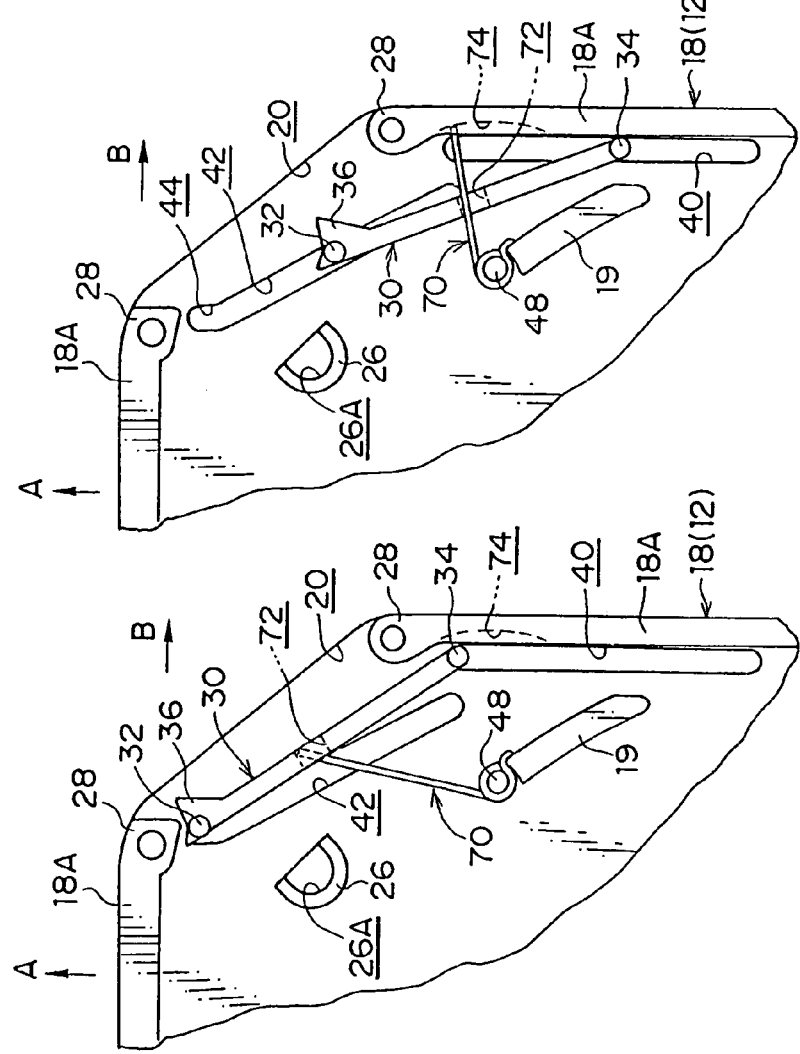
FIG. 15C is a view, as seen with the upper case removed, showing the modified example of the urging member which forms the recording tape cartridge relating to the embodiment of the present invention, and is a plan view showing a state in which the opening is opened.
Figure 16:
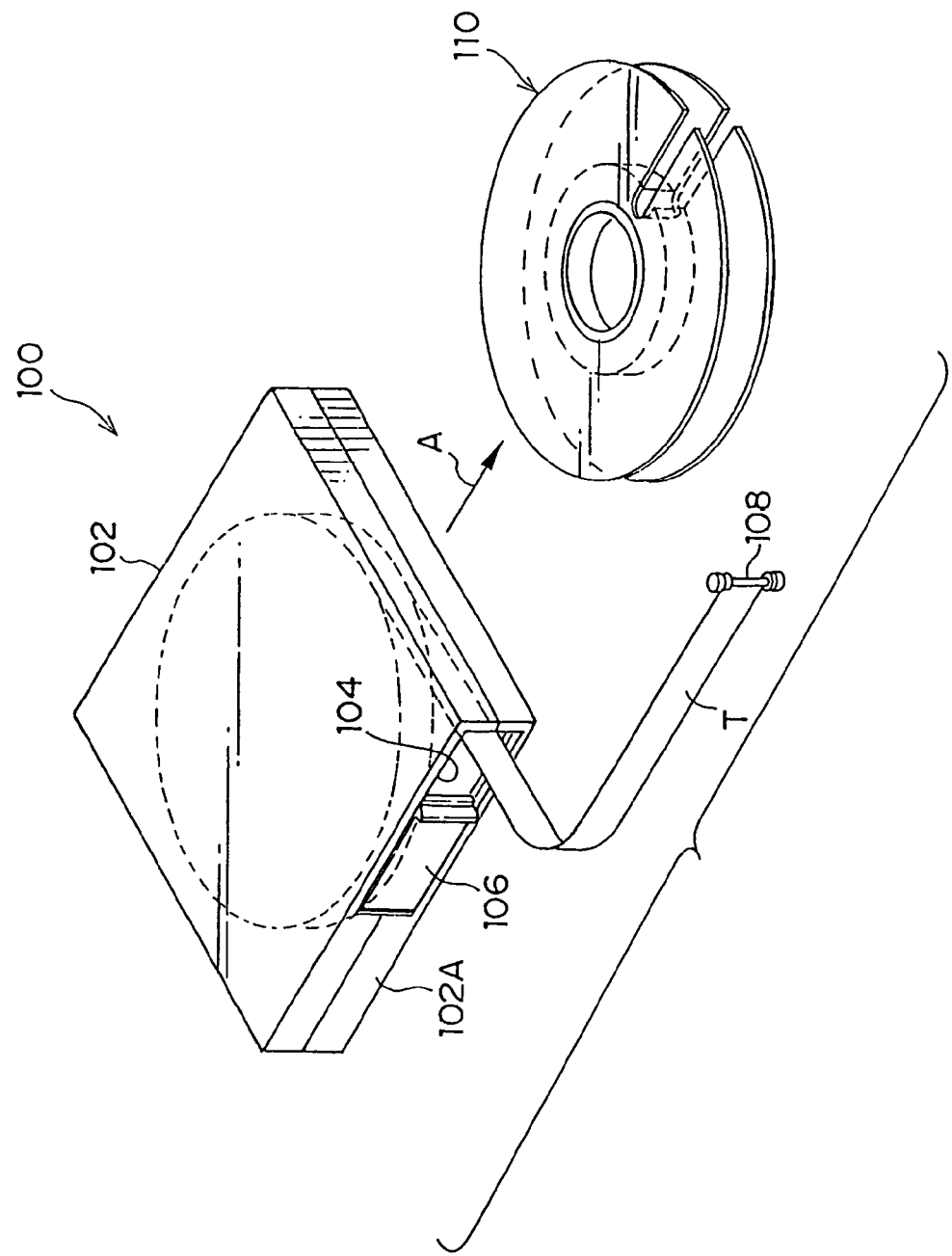
FIG. 16 is a perspective view showing the overall structure of a conventional recording tape cartridge.
Figure 17:
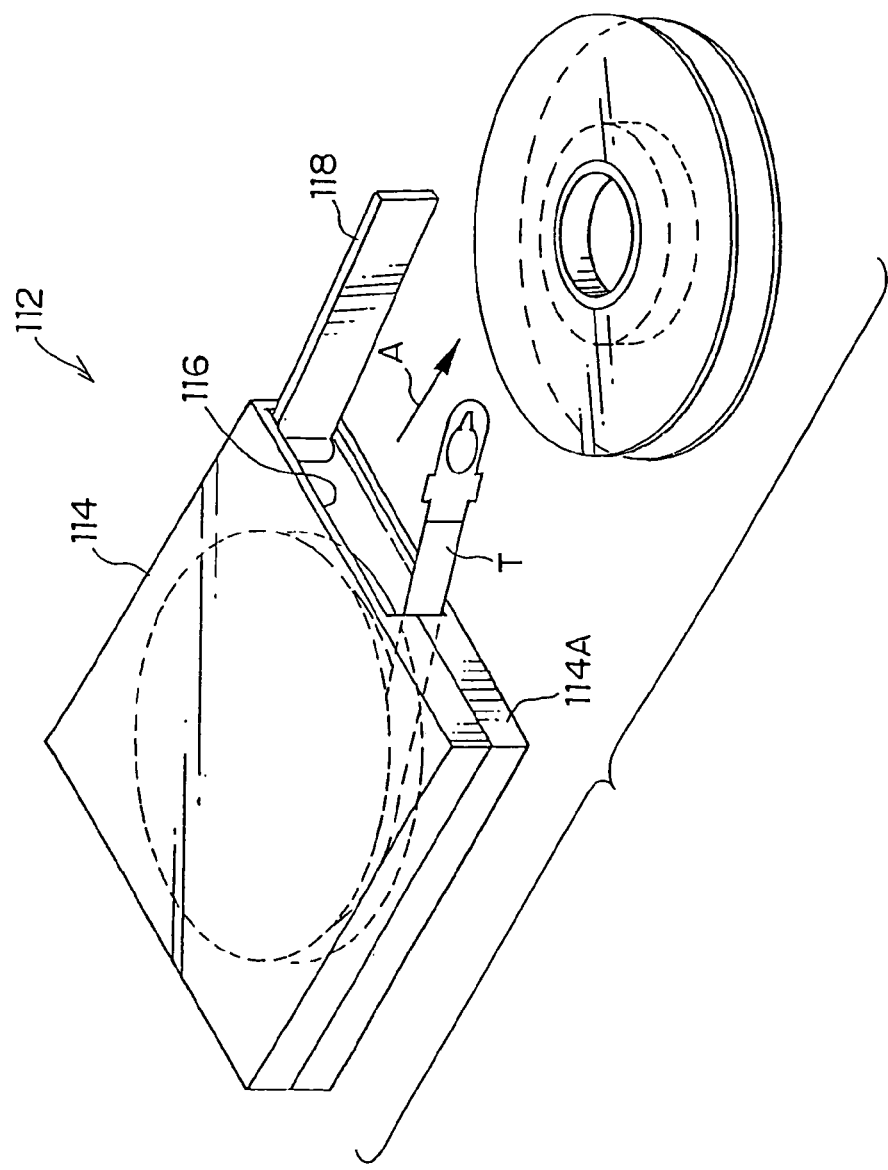
FIG. 17 is a perspective view showing the overall structure of a conventional recording tape cartridge.

In the above-described embodiment, the plate spring 46, which serves as an urging member which urges the door 30 in the direction of closing the opening 20, is provided. However, the present invention is not limited to the same. For example, as shown in FIG. 14 and in FIGS. 15A, 15B and 15C, in place of the plate spring 46, a torsion spring 70 may be provided. In this structure, in the processes of opening and closing the opening 20, in order to eliminate the force of the torsion spring 70 pushing the door 30 outwardly, a spring receiving portion 72, which is cut-out through the entire plate thickness of the door 30 in the lower end portion of the center of the door 30, is provided, and the distal end of the torsion spring 70 passes and escapes through the door 30. Further, a relief groove 74, which is arc-shaped as seen in plan view, is formed in the peripheral wall 18A so that this distal end of the torsion spring 70 does not interfere with the case 12 (the lower case 18). In accordance with this structure as well, the same effects as those of the above-described embodiment are achieved.

Moreover, in the above-described embodiment, the first guide groove 40 and the second guide groove 42 are provided independent of one another. However, the present invention is not limited to the same, and the first guide groove 40 and the second guide groove 42 may be formed continuously with one another.

In the above-described embodiment, a magnetic tape T is used as the recording tape. However, the present invention is not limited to the same. The recording tape is to be interpreted as being an elongated-tape-shaped information recording/playback medium on which information can be recorded and from which information can be played back. The recording tape cartridge relating to the present invention can be applied to recording tapes of any recording/playback system.

As described above, the recording tape cartridge relating to the present invention has the excellent effects that an opening, which is structured such that the pull-out path of the recording tape can be made to be the shortest, can be opened and closed without a cover member, which enables the accommodating space within a drive device to be made small, interfering with a reel and a leader member, and that an opening/closing mechanism of the drive device, which opening/closing mechanism operates the cover member and opens and closes the opening, can be made to have a simple structure.

What is claimed is:

1. A recording tape cartridge comprising:
a case for housing a reel of a recording tape and having, at a corner portion, an opening for pulling-out one end of the recording tape;
a cover member which opens and closes the opening; and
an urging member urging the cover member in a direction in which the opening is closed,
wherein the urging member is a torsion spring, and
wherein the cover member is accommodated within the case when the opening is open,
wherein the opening has a plane of opening that is inclined with respect to an insertion direction of loading the recording tape cartridge into a drive device, and the plane of opening extends from a front side of the recording tape cartridge to the right side of the recording tape cartridge, wherein the front side is defined as the front of the recording tape cartridge in the insertion direction and the right side is orthogonal to the insertion direction.

2. A recording tape cartridge according to claim 1, wherein the case includes a first guide groove and a second guide groove for guiding the cover member to open and close the opening, and wherein the second guide groove is inclined with respect to the insertion direction.

3. A recording tape cartridge comprising:

a case for housing a reel of a recording tape and having, at a corner portion, an opening for pulling-out one end of the recording tape;

a cover member which opens and closes the opening; and an urging member urging the cover member in a direction in which the opening is closed, wherein the urging member is a torsion spring, and wherein one end of the torsion spring passes through the cover member, and an arc-shaped groove is formed in a side wall of the case, and when the cover member opens the opening, the one end of the torsion spring passes through the arc-shaped groove.

* * * * *